(12) United States Patent
Cummins

(10) Patent No.: US 10,148,151 B2
(45) Date of Patent: Dec. 4, 2018

(54) SIGNALS AND SYSTEMS FOR CONTROLLING AN ELECTROMAGNETIC PISTON FOR A VEHICLE

(71) Applicant: Patrick Dean Cummins, Sunnyvale, CA (US)

(72) Inventor: Patrick Dean Cummins, Sunnyvale, CA (US)

( * ) Notice: Subject to any disclaimer, the term of this patent is extended or adjusted under 35 U.S.C. 154(b) by 397 days.

(21) Appl. No.: 15/068,640

(22) Filed: Mar. 14, 2016

(65) Prior Publication Data

US 2016/0308421 A1 Oct. 20, 2016

Related U.S. Application Data

(60) Provisional application No. 62/149,694, filed on Apr. 20, 2015.

(51) Int. Cl.
*H02K 7/06* (2006.01)
*H02K 7/075* (2006.01)
*B60L 11/18* (2006.01)
*B60L 8/00* (2006.01)
*H02K 33/16* (2006.01)
*B60L 15/20* (2006.01)
*B60L 3/00* (2006.01)
*B60L 11/00* (2006.01)
(Continued)

(52) U.S. Cl.
CPC .......... *H02K 7/075* (2013.01); *B60K 7/0007* (2013.01); *B60K 17/356* (2013.01); *B60L 3/0061* (2013.01); *B60L 8/003* (2013.01); *B60L 11/005* (2013.01); *B60L 11/1807* (2013.01); *B60L 11/1861* (2013.01); *B60L 11/1864* (2013.01); *B60L 15/20* (2013.01); *B60L 15/2036* (2013.01); *H02K 33/16* (2013.01); *B60K 2007/003* (2013.01); *B60K 2007/0069* (2013.01); *B60K 2007/0076* (2013.01); *B60L 2220/46* (2013.01); *B60L 2220/50* (2013.01); *B60L 2240/12* (2013.01); *B60L 2240/36* (2013.01); *B60L 2240/423* (2013.01); *B60L 2240/425* (2013.01); *B60L 2260/28* (2013.01); *Y02T 10/641* (2013.01); *Y02T 10/645* (2013.01); *Y02T 10/7005* (2013.01); *Y02T 10/7022* (2013.01); *Y02T 10/7044* (2013.01); *Y02T 10/7061* (2013.01); *Y02T 10/7083* (2013.01); *Y02T 10/72* (2013.01); *Y02T 10/7275* (2013.01)

(58) Field of Classification Search
CPC .......... H02K 33/10; H02K 33/16; H02K 3/24; H02K 33/18; H02K 35/04
USPC ........... 310/11, 15–17, 19–20, 23, 30, 34–35
See application file for complete search history.

(56) References Cited

U.S. PATENT DOCUMENTS 6,049,146 A * 4/2000 Takara ............... F03G 7/00
310/23
6,914,353 B2 * 7/2005 Hong ................. H02K 33/16
310/13

(Continued)

*Primary Examiner* — Thanh Lam
(74) *Attorney, Agent, or Firm* — Patrick Dean Cummins

(57) ABSTRACT

This application relates to an electric piston for a vehicle. The electric piston can include magnetic device configured to repel and attract each other in order to force a crankshaft of a vehicle to rotate and propel the vehicle. The electric piston can receive an oscillating current or voltage signal from a control system of the vehicle in order to realize the motion of the electric piston. The control system can modify the shape of the oscillating signal in order to improve energy consumption of the vehicle.

20 Claims, 15 Drawing Sheets

(51) Int. Cl.
*B60K 7/00* (2006.01)
*B60K 17/356* (2006.01)

(56) References Cited

U.S. PATENT DOCUMENTS

| | | | |
|---|---|---|---|
| 2005/0150731 A1* | 7/2005 | Hitchcock | F16F 9/535 188/267 |
| 2006/0108880 A1* | 5/2006 | Lee | F04B 35/045 310/14 |
| 2008/0042497 A1* | 2/2008 | Parker | H02K 7/06 310/24 |
| 2008/0079320 A1* | 4/2008 | Beaulieu | F02B 63/04 310/15 |

* cited by examiner

SIGNALS AND SYSTEMS FOR CONTROLLING AN ELECTROMAGNETIC PISTON FOR A VEHICLE

CROSS-REFERENCE TO RELATED APPLICATIONS

This application claims the benefit of a prior-filed provisional application No. 62/149,694, filed Apr. 20, 2015, the content of which is incorporated herein by reference for all intents and purposes.

FIELD

The described embodiments relate generally to an electric device for creating mechanical motion. More particularly, the present embodiments relate to an electromagnetic piston that uses electromagnetic force to mechanical motion.

BACKGROUND

As electric devices become more prevalent in consumer markets, a drive to improve the energy efficiency and portability of electronic devices has increased. In some devices such as electric motors, techniques for creating mechanical motion from electricity have been relatively unchanged for decades. As a result, many electric motors can be bulky, taking up more space than necessary. Moreover, electric motors can include complicated configurations for manifesting the various electromagnetic fields required to generate mechanical motion from the electric motor. Such configurations can be difficult to manufacture, and in some cases be prone to error and manufacturing defects. Additionally, controllability of an electric motor can prove difficult at times when the basic design of an electric motor does not accommodate for precise control instructions.

SUMMARY

This paper describes various embodiments that relate to an electric piston for a vehicle. In some embodiments, a vehicle is set forth. The vehicle is configured to be propelled by at least one electromagnetic piston. The electromagnetic piston can be configured to oscillate when energized by a driving signal that is provided to the electromagnetic piston using a control system of the vehicle. The electromagnetic piston is further configured to adjust a velocity of the vehicle when the driving signal changes frequency, amplitude, or phase. Furthermore, the electromagnetic piston is configured to rotate a crankshaft connected to at least one wheel that supports a weight of the vehicle. Additionally, the electromagnetic piston can include an outer device and an inner device that are each configured to provide a magnetic field, at least one of the outer device and inner device that are configured to receive the driving signal.

In other embodiments, an electric piston for a vehicle is set forth. The electric piston can include a first inductor surrounding a cavity of the electric piston and a suspension connected to the first inductor. The electric piston can further include a second inductor at least partially surrounded by the first inductor and suspended within the cavity of the first inductor by way of the suspension. Additionally, the first inductor and the second inductor can be configured to receive an oscillating drive signal from a control system of the vehicle. In response to the drive signal, the electric piston can provide an electromagnetic force that causes: (i) the second inductor to move toward and/or away from the first inductor, (ii) a heat exchange to occur within the cavity of the first inductor when an gas or fluid external to the first inductor moves into the cavity as a result of the second inductor moving toward and/or away from the first inductor, and (iii) a crankshaft of the vehicle to rotate a wheel of the vehicle. Furthermore, the electric piston is configured to propel the vehicle using, non-concurrently, both (i) a direct current (DC) signal and (ii) an alternating current (AC) signal.

In yet other embodiments, a system for operating an electric piston of a vehicle is set forth. The system can include a power source configured to a power the vehicle, and a control system configured to provide an oscillating current signal to the electric piston using the power from the power source. The oscillating current signal can be generated based on an input provided by a user of the vehicle. The system can further include a crankshaft connected to the electric piston and a vehicle wheel, wherein the electric piston is configured to move the vehicle when the oscillating current signal is received by the electric piston and the electric piston rotates the crankshaft and the vehicle wheel. In some embodiments, the oscillating current signal is generated based on a feedback signal that is produced during an operation of the electric piston in order to improve energy efficiency of the vehicle.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1A:
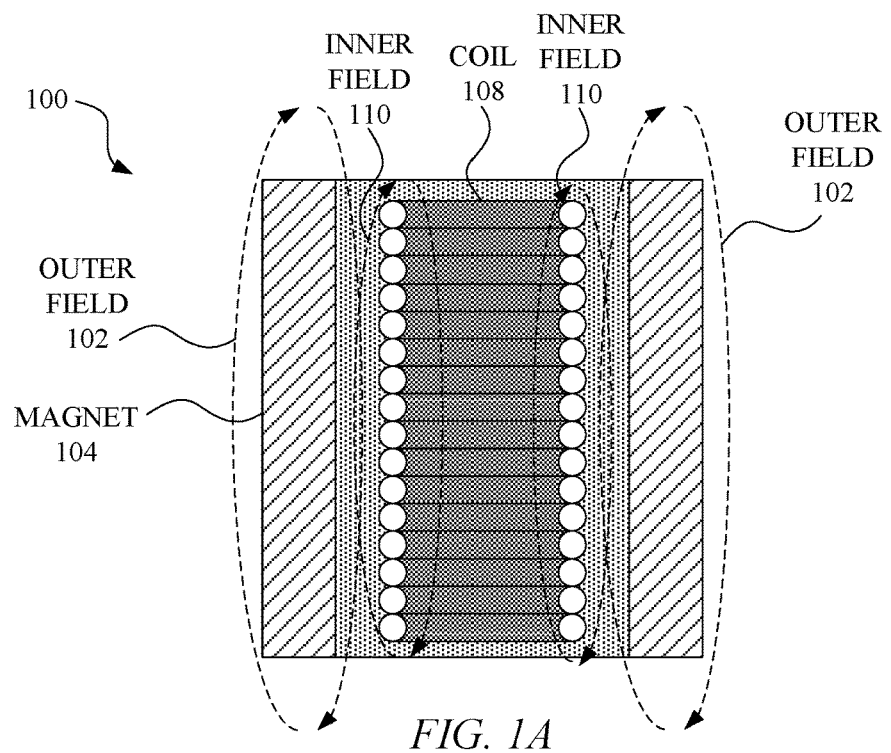
FIGS. 1A and 1B illustrate a cross sectional view of a portion an electromagnetic piston according to some embodiments discussed herein.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments discussed herein relate to systems, methods, and apparatus for using electromagnetic force to accomplish a piston motion in order to perform a mechanical motion. Typically, rotating electric motors are used for accomplish mechanical motion with an electric power source. However, many electric motors are bulky and occupy a lot of space when designed for applications requiring large amounts of torque. The embodiments discussed herein are provided to overcome the inefficiencies of previous electric motors. In some embodiments, an electromagnetic piston is used to accomplish mechanical motion of an axis. The electromagnetic piston can include a primary coil made of magnetic wire or any other suitable material for creating an electromagnetic field. The electromagnetic piston can also include a secondary coil or permanent magnet that is either surrounded by the primary coil or surrounds the primary coil. In this way, when the permanent magnet is used and the primary coil receives an alternating current signal, the primary coil will oscillate toward and away from the permanent magnet. Additionally, when the secondary coil is used and both the primary coil and the secondary coil receive alternative currents having opposing peaks (e.g., positive and negative peaks relative to a y-axis, wherein the x-axis is time and the y-axis is current), the primary and secondary coils will be repelled toward and away from each other. When the primary coil and/or the secondary coil are mechanically coupled to a piston rod, the piston rod can be caused to oscillate according to the motion of the primary coil and/or the secondary coil. The motion of the piston rod can be used in numerous ways to accomplish mechanical motion. For example, when the piston rod is mechanically coupled to a crankshaft, the crankshaft can be caused to rotate when the electromagnetic piston is receiving alternating current through the primary coil and/or the secondary coil. The crankshaft can include pin(s), throw(s), and counterweight(s), with varying or equal angles for the pins and/or counterweights. When the crankshaft is mechanically coupled to a wheel, the wheel can rotate based on the motion of the electromagnetic piston. In this way, the electromagnetic piston can be used to drive the motion of a vehicle. Therefore, electromagnetic pistons will be able to replace previous electric motors in electric vehicles in order to provide more efficient electric vehicles.

In some embodiments discussed herein, multiple electromagnetic pistons can be mechanically coupled to a crankshaft. The electromagnetic pistons can be configured to oppose each other, thereby causing their respective directions of oscillations in opposing directions relative to a similar axis of motion. In other embodiments, the electromagnetic pistons can be arranged around a crankshaft and have one or more equal or different angles of separation between the electromagnetic pistons. Additionally, the piston rods of the electromagnetic pistons can be configured to contact a single point of rotation of the crankshaft, or be configured to contact multiple different points of rotation of the crankshaft respectively. The piston rods of the electromagnetic pistons can be configured to oscillate in the same or different patterns. For example, a first piston rod extended more proximate to the crankshaft than a second piston rod at certain points during oscillations of the first piston rod and the second piston rod. During oscillation of first piston rod and the second piston rod, the crankshaft can be caused to rotate as a result of the mechanical motion from the electromagnetic pistons, respectively. The electromagnetic pistons can be driven by alternating current received by one or more coils of the electromagnetic pistons. The alternating current can have a frequency and period such that a full period of the alternating current causes an electromagnetic piston to force the crankshaft to rotate approximately one complete rotation. In other embodiments, the alternating current have a period that causes the electromagnetic piston to force the crankshaft to rotate more or less than one complete rotation. In some embodiments, the piston rod of an electromagnetic piston can be mechanically coupled to a device that provides a mechanical advantage. For example, the piston rod can be mechanically coupled to one or more gears that are directly or indirectly mechanically coupled to a crankshaft. In this way, the force required to perform a complete rotation of the crankshaft will can be modified according to the device providing the mechanical advantage. This enables the amount of force required to rotate the crankshaft to be distributed over multiple oscillations of the piston rod.

In some embodiments, one or more electromagnetic pistons can be mechanically coupled to the wheel of a vehicle. It should be noted that the phrase mechanically coupled is used herein to refer a first object that is capable of causing a direct or indirect mechanical force to be applied to a second object through some initial source of energy. Each of the one or more electromagnetic pistons can cause the vehicle to move according to the motion of the wheels, which is accomplished by the oscillating force of the electromagnetic pistons. The wheels can each be coupled to an axil that is mechanically coupled to a crankshaft (or the axil is the crankshaft) and at least one electromagnetic piston can be mechanically coupled to each crankshaft of each wheel. When all of the electromagnetic pistons receive an oscillating or alternating electric current, each crankshaft of each wheel will be forced to turn thereby effectively causing the vehicle to move. In some embodiments, not all of the wheels are mechanically coupled to an axil and electromagnetic piston. For example, in some embodiments, only a front pair of wheels or a back pair of wheels of the vehicle is mechanically coupled to an axil or crankshaft. Additionally, in some embodiments, only the front pair of wheels or the back pair of wheels are mechanically coupled to an electromagnetic piston, and each wheel is mechanically coupled to a different crankshaft.

A current provided to the electromagnetic pistons to cause the piston rods to oscillate can be direct current or alternating current. In some embodiments, the current can be defined by a period or frequency that corresponds to the motion of the piston rod when the electromagnetic receives the current. In other embodiments, the current can be defined by a discrete time signal or digital signal with one or more amplitude values over time. The current can be any suitable periodic signal in the time domain, not limited to a sine wave, cosine wave, square wave, triangular wave, rectangular wave, sawtooth wave, pulse train, trigger wave, spike wave, exponential spike wave, and/or any combination thereof. In some embodiments, a wave form of the current source provided to the electromagnetic piston can change over time and concurrently with the motion of the piston rod of the electromagnetic piston. The current can be optimized to reduce energy consumption as a result of operating one or more piston rods. For example, alternating current (AC) motors typically run off of a sinusoidal current source, which can be inefficient to produce continually and result in wasted energy. Therefore, by using an electromagnetic piston, capable of operating from source of sinusoidal and non-sinusoidal current, instead of an AC motor more energy efficient motion can be realized. For example, when operating from an AC source, an AC motor is constantly undergoing a transfer of current whereas an electromagnetic piston can in some embodiments only operate from a current pulse. Additionally, when multiple electromagnetic pistons are mechanically coupled to a crankshaft, each of the electromagnetic pulses can receive individual current pulses separated by a rest period. For example, if the period of a single rotation is a time period T, and there are four electromagnetic pistons mechanically coupled to the crankshaft, the pulses can be provided as follows: a first pulse can be received by a first electromagnetic piston at time 0 or the start of the period, a second pulse can be received by a second electromagnetic piston at time T/4, a third pulse can be received by a third electromagnetic piston at time T/2, and a fourth pulse can be received by a fourth electromagnetic piston at time T/4. In this way, although a pulse is generated for each electromagnetic piston per period, there are periods between the pulses where little or no current is being transmitted. This arrangement can provide improvements in energy efficiency as well as reductions heat generation from constantly transmitting current.

Figure 1B:
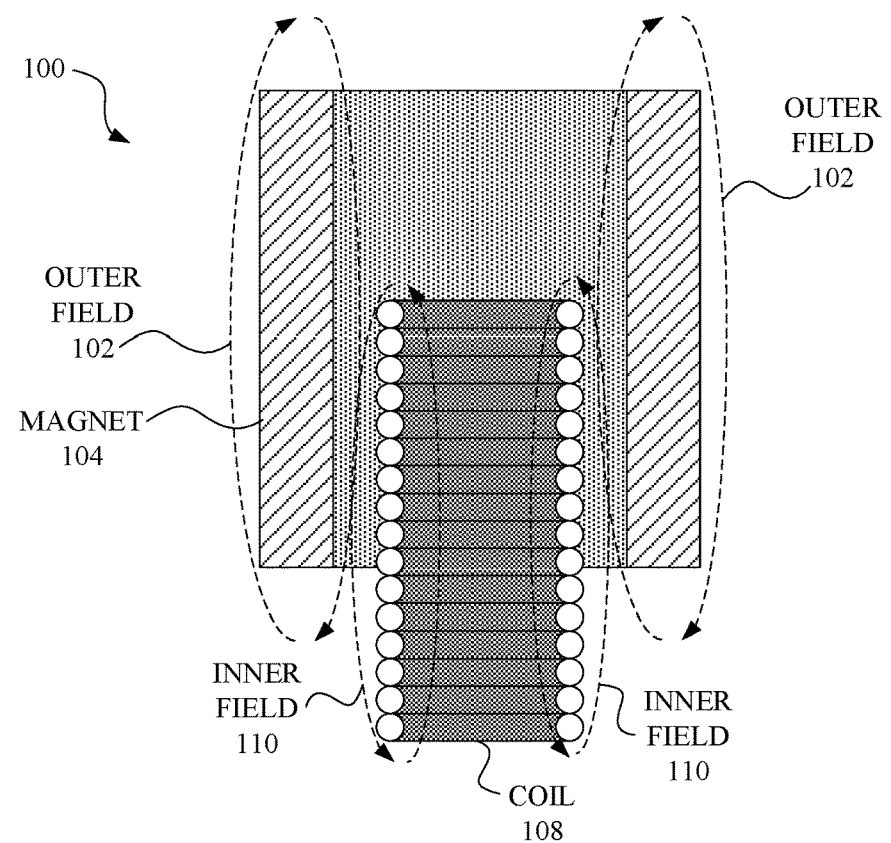

FIGS. 1A and 1B illustrate a cross sectional view of a portion an electromagnetic piston 100 according to some embodiments discussed herein. The electromagnetic piston can include a magnet 104 that at least partially surrounds a coil 108. The coil 108 can be comprised of a conductor coated in an insulating material and configured in the shape of a cylinder. However, it should be noted that the coil 108 can be configured in any suitable shape having a cross-section resembling a circle, square, oval, polygon, or any other suitable shape for a coil. Additionally, the coil can be made from any suitable conductive material. For example, the coil 108 can include one or more particles not limited to copper, iron, silver, gold, aluminum, calcium, beryllium, rhodium, magnesium, iridium, tungsten, zinc, cobalt, cadmium, nickel, ruthenium, lithium, platinum, palladium, tin, selenium, niobium, steel, chromium, lead, vanadium, zirconium, titanium, or any other suitable material or element. Additionally, the magnet 104 can be any suitable type of magnet such as but not limited to permanent, temporary, and/or an electromagnet. In some embodiments, the magnet 104 can be a permanent magnet. The magnet 104 can be a ferrite magnet, ceramic magnet, rare earth magnet, neodymium iron boron magnet, samarium cobalt magnet, alnico magnet, or any other suitable magnet. Additionally, in other embodiments the magnet 104 can be an electromagnet or temporary magnet as further discussed herein. The magnet 104 can be any suitable shape having a cross section not limited to a circle, oval, square, rectangle, polygon, or any other suitable shape for a magnet.

During operation of the electromagnetic piston, the coil 108 can receive an electric current causing the coil 108 to generate or exhibit an electromagnetic field. The electromagnetic field is referred to as an inner field 110 because it is associated with the coil 108, which is at least partially surrounded by the magnet 104. The inner field 110 can be modified or adjusted based on the current received by the coil 108. When the coil 108 receives an alternating current, the coil 108 can be caused to be attracted to (as shown in FIG. 1A) or repel (as shown in FIG. 1B) an outer field 102 of the magnet 104. In this way, the coil 108 will oscillate according to the current received by the coil 108. Additionally, the coil 108 will oscillate according to the frequency of an alternating current received by the coil 108. When the coil 108 is mechanically coupled to a piston rod and a crankshaft, the oscillation of the coil 108 can cause the crankshaft to rotate according to the frequency of the alternating current received by the coil 108. For example, when the coil 108 receives a periodic signal such as a pulse train, sine wave, rectangular wave, or any other suitable periodic signal, the crankshaft will be caused to move and rotate in a manner that corresponds to the periodic signal being provided to the coil 108. It should be noted that although the input signal to the coil 108 is not shown in the figures, a conductive pathway between the coil 108 and a source of the input signal (e.g., the periodic signal for controlling the electromagnetic piston 100) can be created through any suitable means for sending a signal to a coil 108.

Figure 2A:
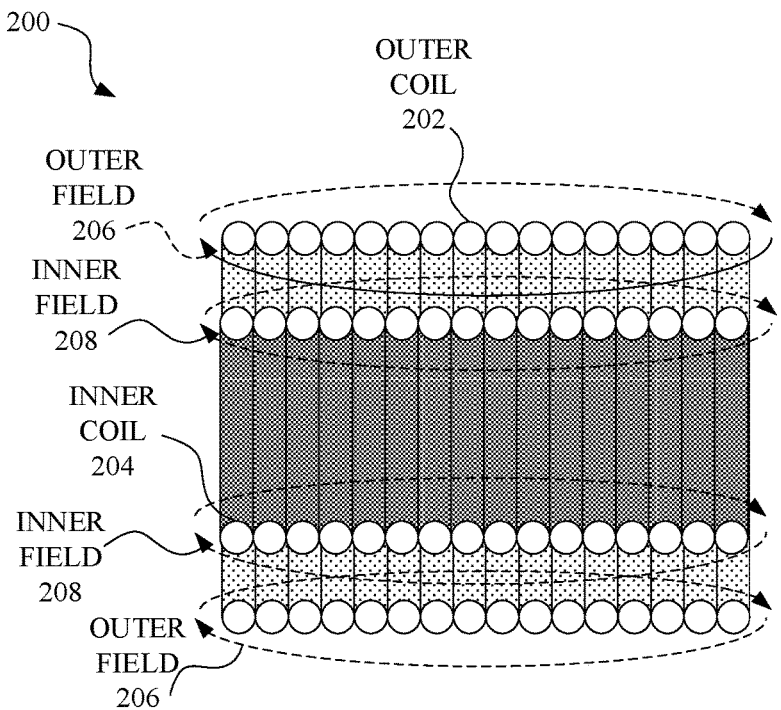
FIGS. 2A and 2B illustrate embodiments of an electromagnetic piston having an inner coil and an outer coil.
Figure 2B:
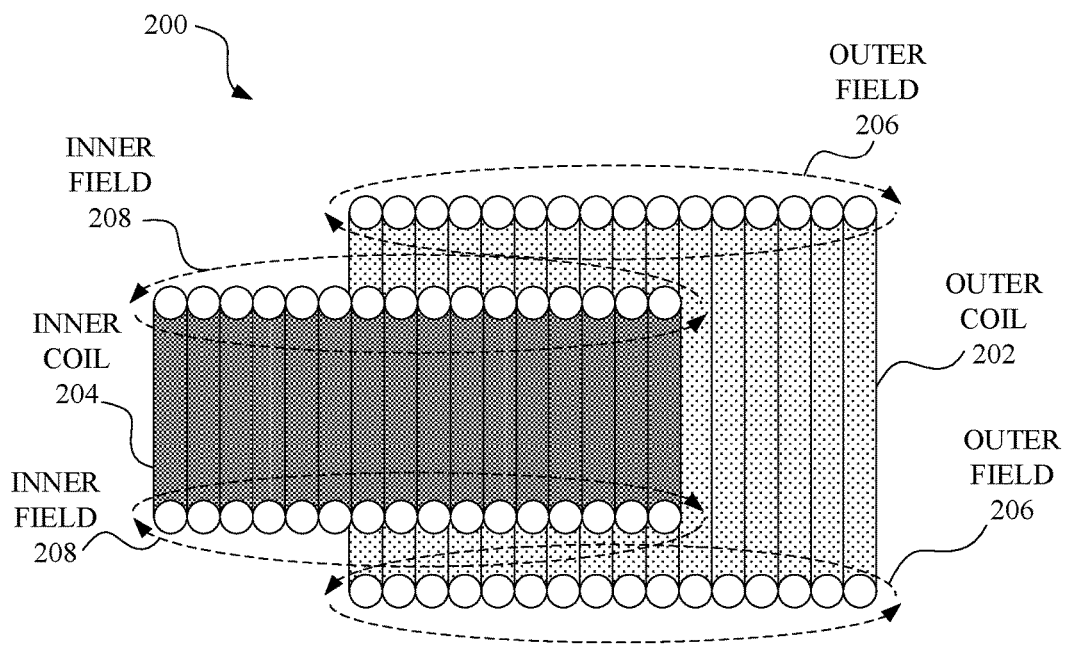

FIGS. 2A and 2B illustrate embodiments of an electromagnetic piston 200 having an inner coil 204 an outer coil 202. Specifically, FIGS. 2A and 2B illustrate embodiments of the electromagnetic piston 200 having an inner coil 204 for generating an inner field 208 when the inner coil 204 receives a first electric current. Additionally, the electromagnetic piston 200 can include the outer coil 202 for generating an outer field 206 when the outer coil 202 receives a second electric current. In some embodiments, the first electric current can be the same as the second electric current, or at least derived from the first electric current. For example, in some embodiments, the first electric current can be transferred from the inner coil 204 to the outer coil 202 through a conductive medium or wireless signal. In other embodiments, the first electric current is different than the second electric current. For example, the first electric current can be provided from a different source than the second electric current. In FIG. 2A the inner field 208 and the outer field 206 cause the inner coil 204 and the outer coil 202 to be attracted to each other because the direction of the first electric current and the second electric current respectively. In FIG. 2A, the inner field 208 and the outer field 206 cause the inner coil 204 and the outer coil 202 to repel each other because the direction of the first electric current and the second electric current respectively. By alternating the direction of the inner field 208 and/or the outer field 206, the inner coil 204 and/or the outer coil 202 can perform mechanical motion. For example, when the outer coil 202 is secured to a surface or point, the inner coil 204 can alternate between repelling the outer coil 202 and being attracted to the outer coil 202. This can depend on the direction of the inner field 208 and the outer field 206 respectively. Alternatively, when the inner coil 204 is secured to a surface or point, outer coil 202 can alternate between repelling the inner coil 204 and being attracted to the inner coil 204. This can also depend on the direction of the inner field 208 and the outer field 206 respectively.

FIGS. 2A and 2B illustrate a cross sectional view of the inner coil 204 and the outer coil 202. In some embodiments, the inner coil 204 and the outer coil 202 can be coil-shaped and resemble a cylinder. However, in other embodiments, the inner coil 204 and the outer coil 202 or a cross-section of the inner coil 204 and the outer coil 202 can be rectangular, polygonal, oval, or any other suitable shape for an electromagnetic coil that can perform mechanical motion. In some embodiments, the inner coil 204 and the outer coil 202 are made from a continuous wire. In other embodiments, the inner coil 204 and the outer coil 202 are made from separate wires.

Figure 3A:
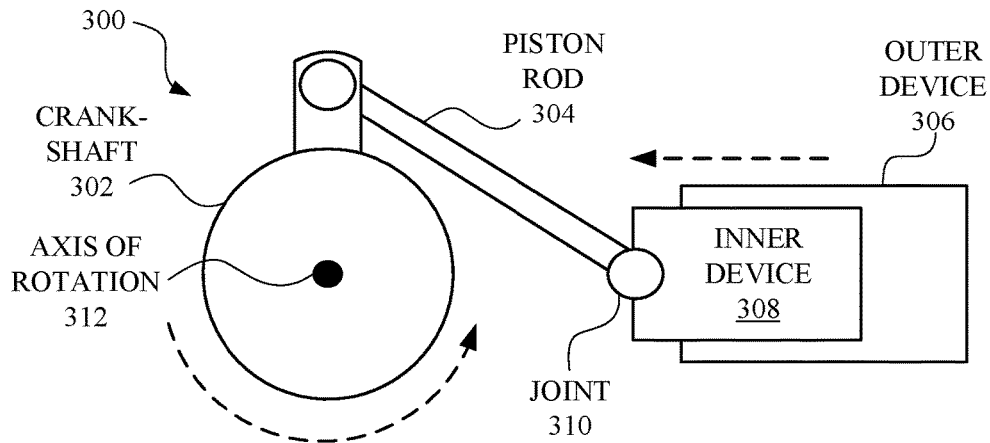
FIGS. 3A-3C illustrate embodiments of a motor being operated according to the movement of an electromagnetic piston.
Figure 3B:
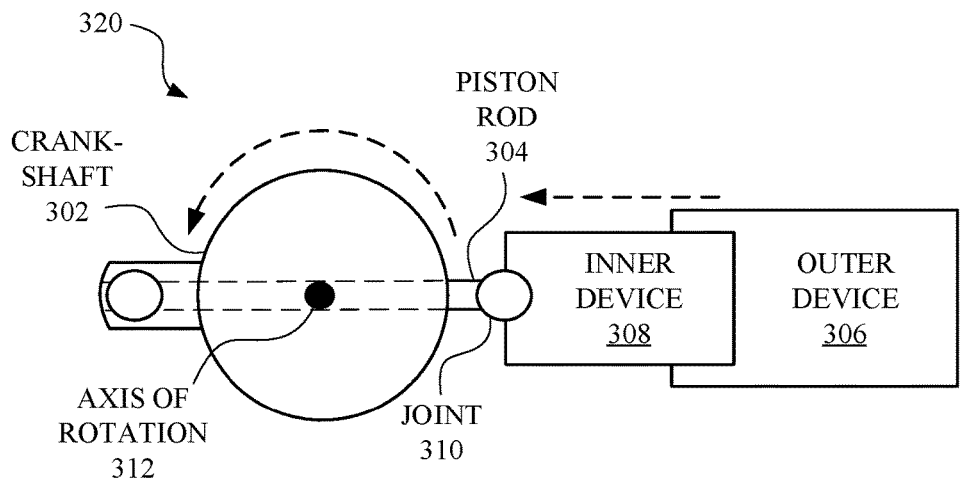
Figure 3C:
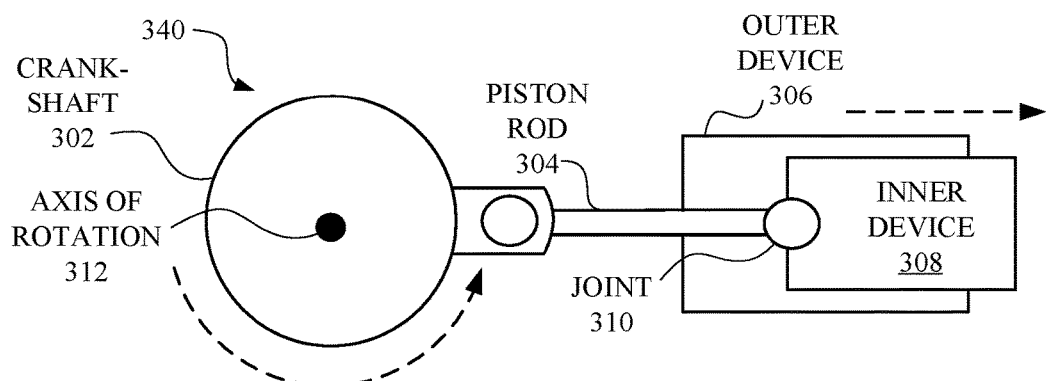

FIGS. 3A-3C illustrate embodiments of a motor 300 being operated according to the movement of an electromagnetic piston. The electromagnetic piston can be defined by at least an outer device 306 and an inner device 308, either of which can cause a piston rod 304 to move and thereby apply force to a crankshaft 302. The outer device 306 can generate a magnetic field or electromagnetic field using by a permanent magnet, temporary magnet, or electromagnet respectively. The inner device 308 can generate a magnetic field or electromagnetic field using by a permanent magnet, temporary magnet, or electromagnet respectively. The inner device 308 can be mechanically coupled to joint 310 that creates a movable connection between the inner device 308 and the piston rod 304. The motor 300 can operate according to the change in direction of the magnetic or electromagnetic field of the inner device 308 or outer device 306 as discussed herein. When the inner field 308 is moving in the same direction as the outer device 306, the inner field 308 will repel the outer device 306. As a result, the piston rod 304 will be put into a motion that causes the crankshaft 302 to rotate, as shown in FIG. 3A. In FIG. 3A an arrow is shown adjacent to the inner device 308 to illustrates the direction of motion of the inner device 308, and the curved arrow adjacent to the crankshaft 302 illustrates the direction of motion of the crankshaft 302. In FIG. 3B the inner device 308 is shown as being forced even further away from the outer device 306, resulting in the crankshaft 302 being rotated even further by the piston rod 304. It should be noted that the piston rod 304 can be a substantially linear rod, a rod with one or more bends, or a rod with one or more curves, or include any other suitable features for a piston rod to effectively rotate a crankshaft.

FIGS. 3A-3B set forth examples of how the inner device 308 can cause the crankshaft 302 to rotate when the inner device 308 is repelled by the outer device 306. Conversely, FIG. 3C illustrates an example of how the inner device 308 can pull on the piston rod 304 to continue rotating the crankshaft 302. As in FIGS. 3A-3B, the crankshaft 302 is being rotated in a counterclockwise direction, though it should be noted that the crankshaft 302 can also be caused to rotate in a clockwise direction according to the motion of the inner device 308. In order to continue the counterclockwise motion, the inner device 308 must generate a magnetic or electromagnetic field that pulls the inner device 308 toward the outer device 306. In this way, the rotation of the crankshaft 302 can be continuous as long as the inner device 308 is periodically being attracted to then repelled by the outer device 306, or vice versa.

Figure 4A:
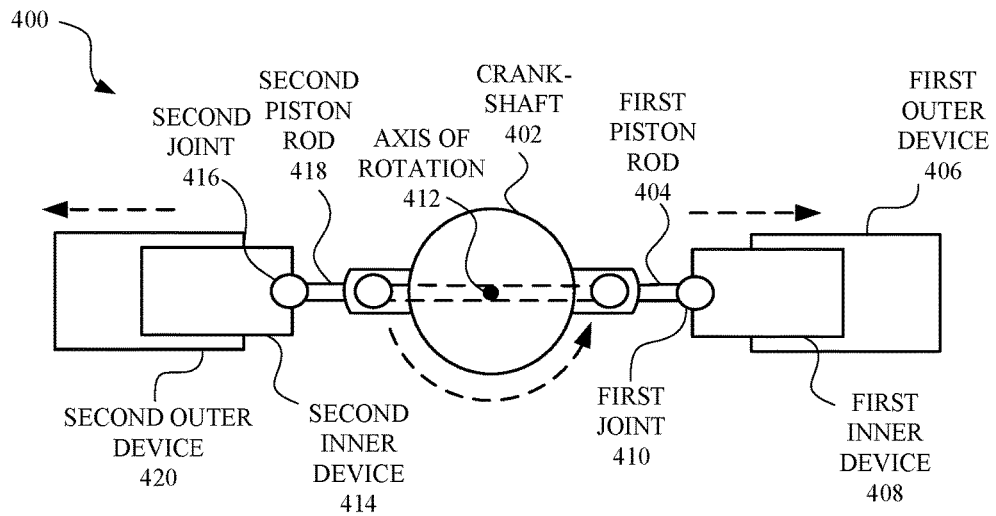
FIGS. 4A-4C illustrate examples of embodiments where at least two electromagnetic pistons are used to rotate a crankshaft.
Figure 4B:
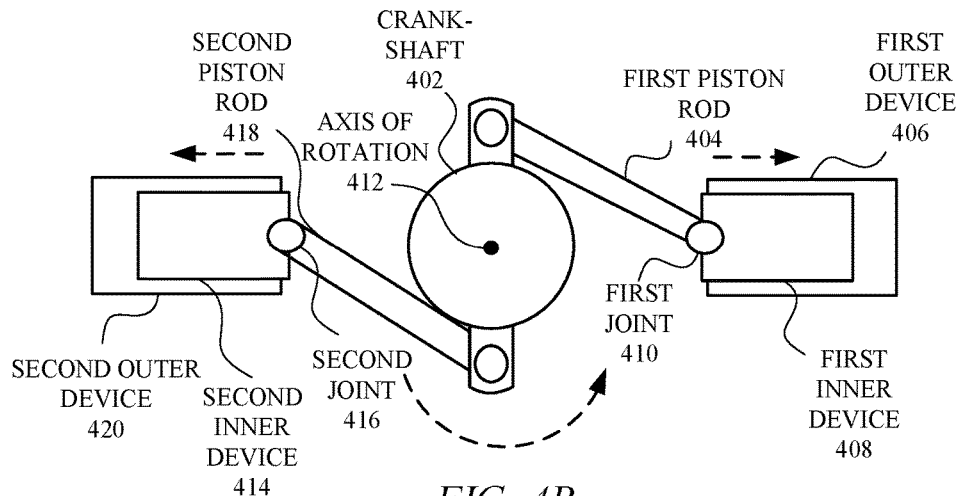
Figure 4C:
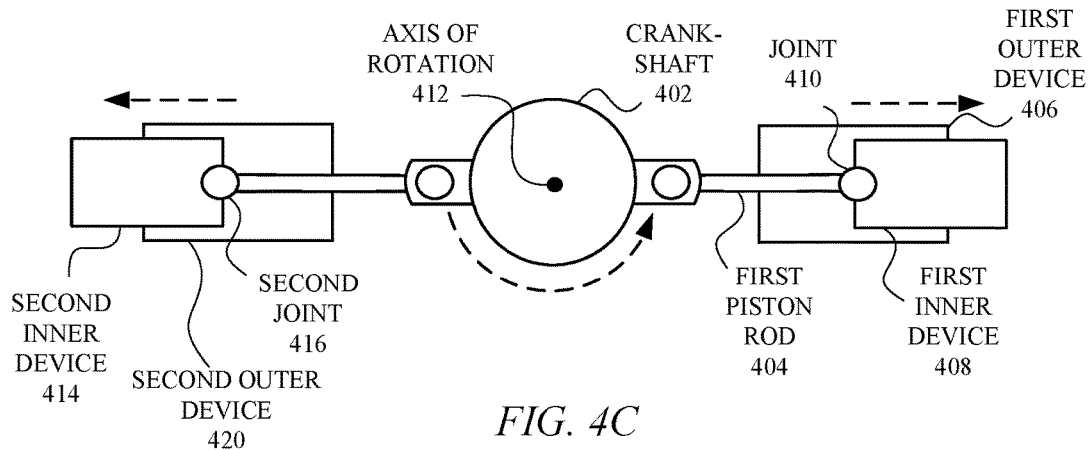

FIGS. 4A-4C illustrate examples of embodiments where at least two electromagnetic pistons are used to rotate a crankshaft. Specifically, multiple electromagnetic pistons are mechanically coupled to a crankshaft 402 on different sides of the crankshaft 402. In FIG. 4A, a first inner device 408 and a first outer device 406 are causing a first piston rod 404 to be forced toward the crankshaft 402 thereby causing the crankshaft 402 to rotate about an axis of rotation 412 in a counter clockwise direction (or clockwise direction in some embodiments). Additionally, a second inner device 414 and a second outer device 420 are causing a second piston rod 418 to be forced toward the crankshaft 402 thereby causing the crankshaft 402 to rotate about an axis of rotation 412 in a counter clockwise (or clockwise direction in some embodiments). Each of the first piston rod 404 and the second piston rod 418 can optionally be connected to a first joint 410 and a second joint 416, respectively. In some embodiments, multiple electromagnetic pistons are connected to the same joint. The first joint 410 and the second joint 416 can be a mechanical device or flexible piece of material that allows for each piston rod (404 and 418) to pivot at their respective inner devices (408 and 414) or outer devices (406 and 420). In some embodiments, the each joint is one or more hinges, and in other embodiments each joint is an elastic or flexible material. Once at a point where the first piston rod 404 and the second piston rod 418 cannot be move away from the first outer device 406 and the second outer device 420 respectively, they are each moved away from the crankshaft 402, as illustrated in FIG. 4B. The first piston rod 404 and the second piston rod 418 are moved away from the crankshaft 402 by the changing of direction of electrical current moving through the first inner device 408 and the second inner device 414. The first piston rod 404 and the second piston rod 418 can also be moved away from the crankshaft by the changing of direction of electrical current moving through the first outer device 406 and the second outer device 420. When the direction of current changes, each of the first inner device 408 and the second inner device 414 are forced toward the first outer device 406 and second outer device 420 respectively. The crankshaft 402 is caused to continue rotating in a counterclockwise (or clockwise direction in some embodiments) direction as a result, as illustrated in FIG. 4C.

Figure 5:
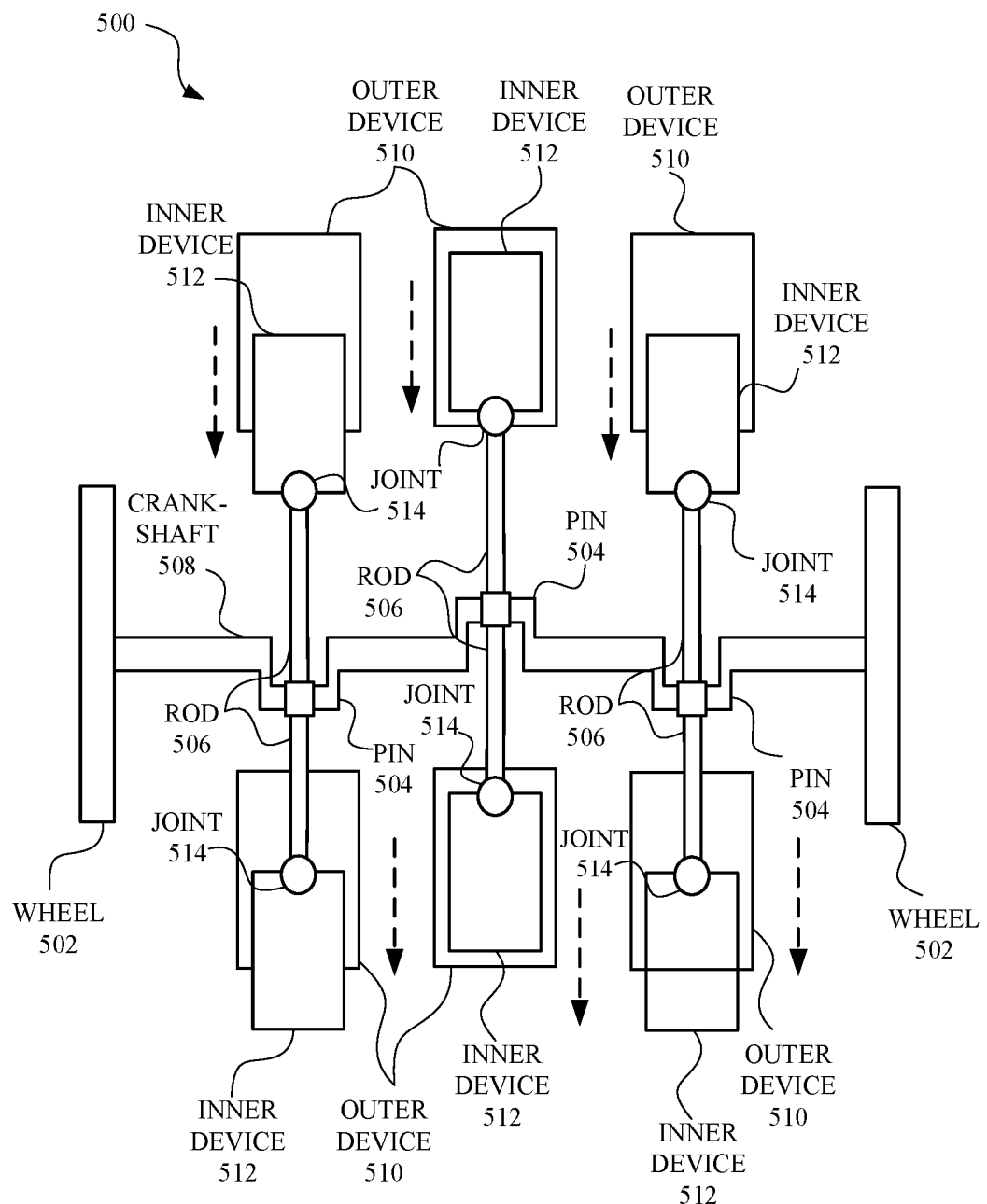
FIG. 5 is a perspective view of electromagnetic pistons mechanically coupled to a crankshaft in order to cause the wheels of the crankshaft to rotate when an electrical current is received by the electromagnetic pistons.

FIG. 5 is a perspective view 500 of electromagnetic pistons mechanically coupled to a crankshaft 508 in order to cause the wheels 502 of the crankshaft 508 to rotate when an electrical current is received by the electromagnetic pistons. Each of the electromagnetic pistons can include an outer device 510 and an inner device 512 for creating magnetic fields, as discussed herein. For example, when an alternating current is received at the outer device 510 and/or inner device 512, each of the outer device 510 and inner device 512 can repel each other causing the inner device 512 (or outer device 510 in some embodiments) to apply force to a joint 514 and a rod 506. The force applied to the joint 514 and the rod 506 can be transferred to a pin 504 or other portion of the crankshaft 508 in order to cause the crankshaft 508 and wheels 502 to rotate according to the electromagnetic pistons and the respective electrical currents they receive.

The number of electromagnetic pistons mechanically coupled to the crankshaft 508 can vary. For example, FIG. 5 illustrates an embodiment with six electromagnetic pistons, each of which including the outer device 510 and inner device 512. Additionally, although FIG. 5 illustrates each of the electromagnetic pistons positioned on the same plane (e.g., on the same x-y plane of FIG. 5), in some embodiments the electromagnetic pistons are not positioned on the same plane. For example, in some embodiments, the direction of motion of the inner device 512 or outer device 510 of a first electromagnetic piston can be in a non-parallel direction of motion to the inner device 512 or outer device 510 of a second electromagnetic piston mechanically coupled to the same crankshaft 508. Furthermore, in some embodiments, the direction of motion of the inner device or outer device 510 of a first electromagnetic piston can be approximately or substantially opposite to a direction of motion to the inner device 512 or outer device 510 of a second electromagnetic piston.

Although FIG. 5 illustrates the electromagnetic piston or pistons effectively turning a wheel, in some embodiments the electromagnetic pistons can be coupled to another device that provides mechanical force. For example, the electromagnetic piston can be incorporated into any suitable mode of transportation, manufacturing process, pump, conveyor, laboratory device, or any other suitable device that provides mechanical force from a source of energy.

Figure 6:
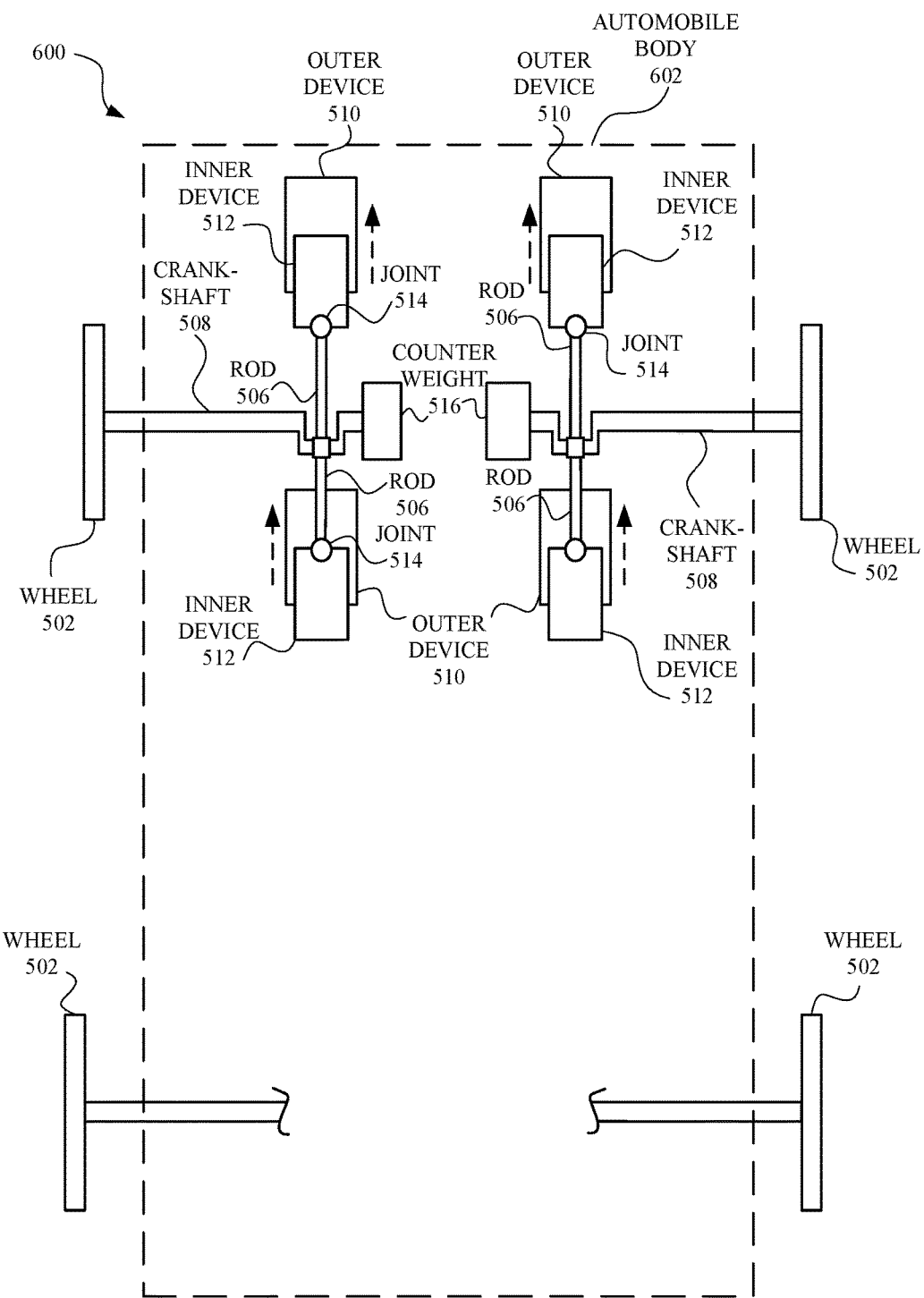
FIG. 6 is a system diagram of a vehicle that has a vehicle body that surrounds one or more electromagnetic pistons.

FIG. 6 is a system diagram 600 of a vehicle that has a vehicle body 602 that in surrounds one or more electromagnetic pistons. The electromagnetic pistons can receive the same or different signals from a signal generator of the vehicle. Additionally, one or more of the electromagnetic pistons can be operatively coupled to one or more wheels 502. In this way, the vehicle can be propelled by the electromagnetic pistons. For example, the electromagnetic pistons can be directly or indirectly operatively coupled to one or more crankshafts 508 that directly or indirectly cause one or more wheels 502 to turn and move the vehicle. FIG. 6 illustrates an embodiments having at least to electromagnetic pistons connected to two wheels 502 respectively. In this way, FIG. 6 can be a rear wheel or front wheel drive vehicle that is powered by electricity and is propelled in part by electromagnetic pistons. The electromagnetic pistons, including the inner devices 512 and outer devices 510, are each mechanically coupled to a rod 506 and joint 514. Each rod 506 is mechanically coupled a crankshaft 508 that is mechanically coupled to a wheel 502. In this way, as each rod 506 oscillates with a movement of the inner device 512 and/or outer device 510, each wheel 502 of the vehicle is caused to rotate. A counterweight 516 can optionally be coupled to each crankshaft 508 in any of the embodiments discussed herein. This provides for a more balanced and uniform rotation of the crankshaft 508 with the each oscillation of the rod 506. Although gears or other devices that provide mechanical advantage are not illustrated in FIG. 6, it should be noted that such devices can be operatively coupled to one or more of the crankshafts 508. The vehicle can be configured carry one or more persons at speeds suitable for driving on a road (e.g., at least 15, 35, and 55 miles per hours, or any other suitable speed). It should be noted that the proportions of each element in all of the Figures herein have been altered in order to provide a more accurate explanation of the embodiments set forth herein. Additionally, FIG. 6 includes similar elements to other drawings described herein and therefore can be understood in view of the other drawings and related descriptions provided herein.

Figure 7:
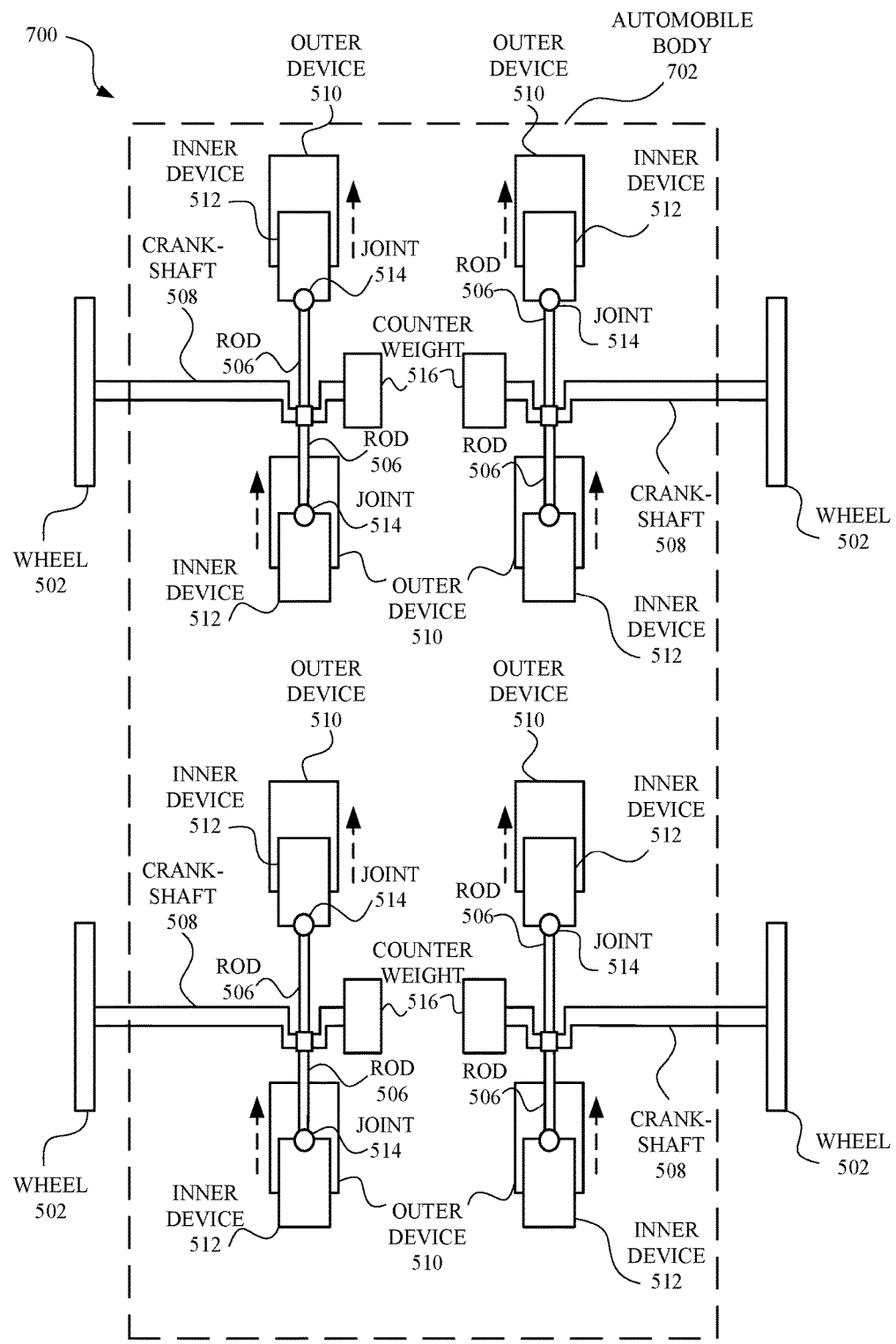
FIG. 7 is a system diagram of a vehicle that has a vehicle body that at least partially surrounds multiple electromagnetic pistons that drive each wheel of the vehicle.

FIG. 7 is a system diagram 700 of a vehicle that has a vehicle body 702 that at least partially surrounds multiple electromagnetic pistons that drive each wheel 502 of the vehicle. The system diagram 700 includes many similar elements discussed with respect to other embodiments, but provides an embodiment where a vehicle is propelled by an electromagnetic piston (i.e., the inner device 512 and outer device 510) coupled at each wheel 502. Each electromagnetic piston operates similar to the other embodiments discussed herein and therefore, FIG. 7 can be understood in view of the discussion of other Figures and elements.

Figure 8:
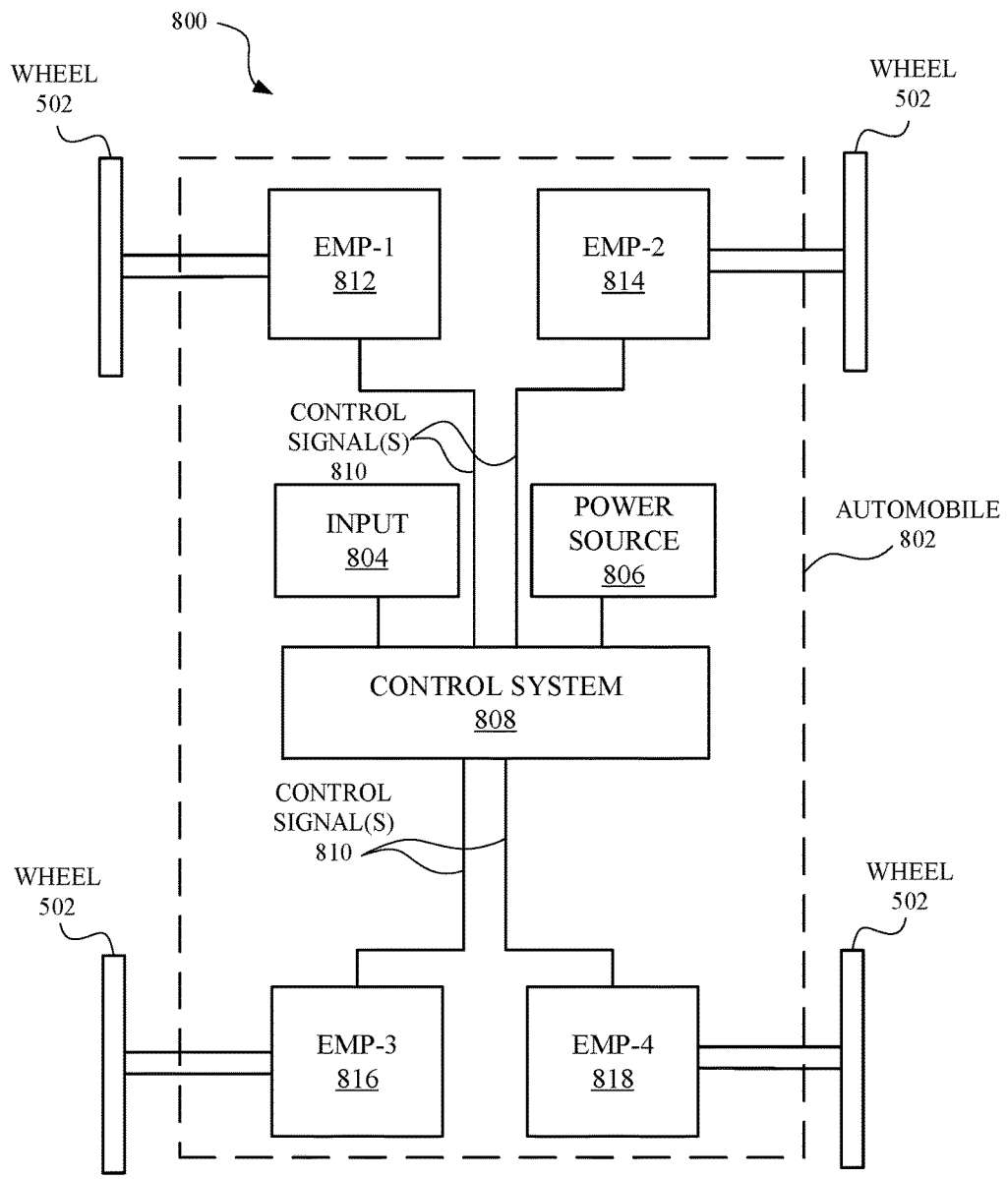
FIG. 8 illustrates a system diagram of a control system that can control one or more electromagnetic pistons (EMP) of a vehicle.

FIG. 8 illustrates a system diagram 800 of a control system 808 that can control one or more electromagnetic pistons (EMP) of a vehicle 802. The vehicle 802 can include a power source 806 that can provide electricity to the control system 808. The power source 806 can be any suitable energy source that can provide electricity as an output. For example, the power source 806 can be one or more capacitors, batteries, solar panels, gas-to-electricity generators, hydrogen-to-electricity generators, a combination thereof, or any other suitable source or combination of sources of electricity. The control system 808 can be connected to an input 804 that provides the control system 808 with a signal that can be used to control the operation of each EMP (i.e., EMP-1 812, EMP-2 814, EMP-3 816, and/or EMP-4). For example, the control system 808 can receive the signal from the input 804 can generate one or more control signal 810 in response. The signal from the input 804 can correspond to a command for each of the EMP's or multiple EMP's.

The input 804 can correspond to a speed input provided by a user of the vehicle 802. In this way, as the user provides a high input or a low input, the input 804 will communicate to the control system 808 a high input signal or a low input signal respectively. The signal communicated from the input 804 to the control system 808 can be an analog or digital signal. Additionally, in certain embodiments where the vehicle incorporates a cruise control or self-driving mode, a signal from the input 804 can be based on a command generated by a computer within the vehicle 802 or a computer that is remote from the vehicle 802 (e.g., a remote computer connected wirelessly to the vehicle 802).

The control system 808 can include one or more processors and one or more memory devices configured to store instructions for the control system 808. The instructions can indicate how to convert the signal from the input 804 to the one or more control signals 810. In some embodiments, the input 804 can indicate to the control system 808 that the control system 808 should cause the EMP's to oscillate slower or faster than a current rate of oscillation of the EMP's. In response, the control system 808 can provide a new control signal to the EMP's that is different than a previous control signal being received by the EMP's. For example, the new control signal can have a higher frequency or a lower frequency than the previous control signal when the input 804 indicates to the control system 808 that the EMP's should oscillate faster or slower, respectively. In other embodiments, the new control signal can have a higher amplitude or a lower amplitude than the previous control signal when the input 804 indicates to the control system 808 that the EMP's should oscillate faster or slower, respectively. It should be noted that each EMP can receive the same control signal 810 or a different control signal. Additionally, in some embodiments, each EMP is connected in parallel or in series. In other embodiments, each EMP is connected in a combination of both serial and parallel connections.

In some embodiments, a shape of the control signal 810 can change over time in order to reduce energy consumption of the EMP's, control system 808, and/or the vehicle 802. For example, as the vehicle 802 is being propelled by the oscillation of the EMP's that turn the wheels 502 of the vehicle 802, a curve of the control signal(s) 810 can simultaneously change with the oscillation of the EMP's. In some embodiments, integrating a half period of a first control signal can yield a first value, and integrating a half period of a second control signal can yield a second value. If the first control signal corresponds to a faster oscillation of the EMP's than the second control signal, then the first value can be configured to be less than the second value. In this way, less charge is used by the first control signal than the second control signal. This transition between the first control signal and the second control signal can be understood through a discussion of a scenario when the vehicle is driving on a highway. In order to accelerate to reach the speed of traffic, an initial control signal is used, which is more wave-like than pulse-like. Over time, the initial control signal can transition into a more pulse-like signal that corresponds to less charge per half period of the more pulse-like signal. In this way, although the more pulse-like signal can have a higher frequency, the more pulse-like signal will be more charge efficient. It should be noted that a "more pulse-like" signal can refer to a drive signal that has a higher slope toward a peak of the drive signal faster than a "more wave-like" signal. For example, square waves and impulse waves have higher slopes than a cosine waves and sine waves of equal frequency to the square waves and impulse signals.

Figure 15:
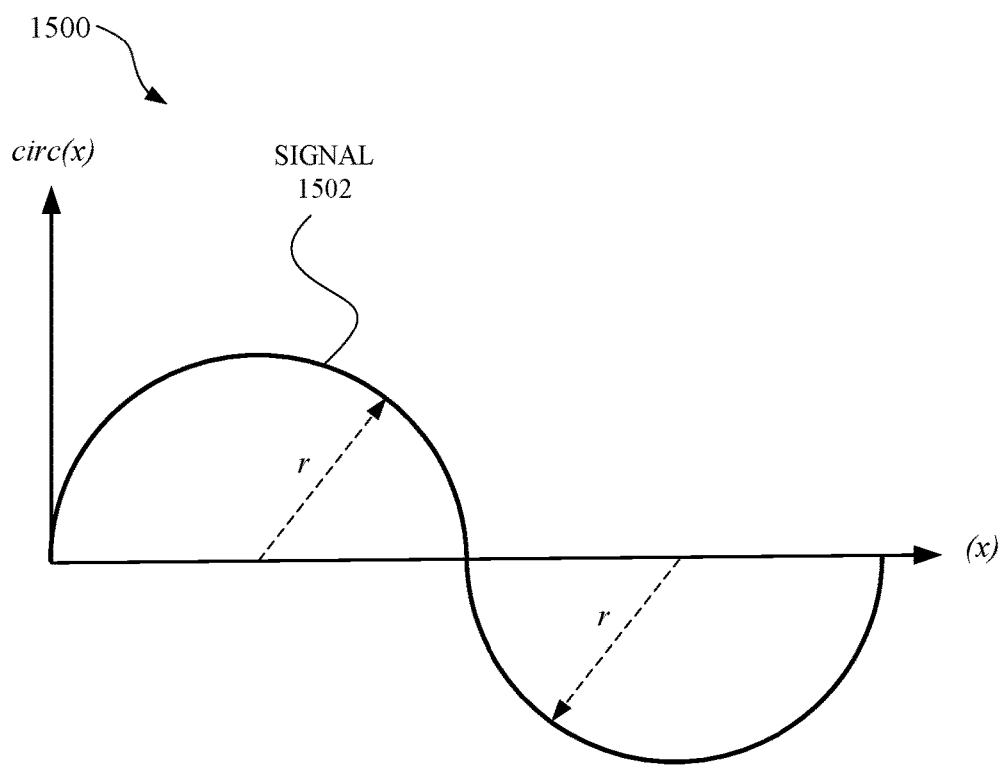
FIG. 15 illustrates a plot of a function called circ(x).

Any suitable controller can be used as the control system 808. The controller can be configured to provide and transition between any suitable signals. The signals that the controller can provide can include impulses (e.g., pulse(t), which is a function of time that outputs periodically alternating impulses), square waves (e.g., square(t), which is a function of time that outputs periodically alternating square waves), sine waves (e.g., sin(t)), cosine waves (e.g., cosine (t)), triangle waves (e.g., tri(t), which is a function of time that outputs periodically triangle waves), circular waves (e.g., circ(x), which is illustrated as signal 1502 in plot 1500 of FIG. 15, and is a function of time that outputs periodically alternating semi-circles, i.e., $circ(t)=r*(cos(pi*t/(2*r))/((1-sin(pi*t/(2*r))^2))^{(1/2)})*((-((4/pi)^2))*a\ tan(sin(pi*t/(2*r))/(1+(1-sin(pi*t/(2*r)^2)^{(1/2)}))^2+1)^{(1/2)}$, where r is a constant. The controller can be configured to send these signals wirelessly or through a wired connection.

In some embodiments, a feedback signal can be generated back on the operation from one or more electromagnetic pistons. For example, the feedback signal can be an electrical current that is provided to a controller or any suitable device for processing a feedback signal. The feedback signal can be directly or indirectly from one or more electromagnetic pistons. In some embodiments the feedback signal can be used by a controller or processor determine whether to modify a shape of a signal that is being provided to one or more of the electromagnetic pistons. In some embodiments, one or more feedback signals from one or more electromagnetic pistons, respectively, can be used by a controller or processor. In some embodiments, one or more of the feedback signals can be used by a controller or processor to determine whether one or more of the electromagnetic pistons are operating synchronously, or otherwise operating accurately with instructions from the controller. For example, if an electromagnetic piston is not pulsing or charging at a time or instance with the controller is directing the electromagnetic piston to pulse or charging, the feedback signal can provide data to the controller indicating this operational inconsistency. Additionally, in some embodiments, energy generated from one or more electromagnetic pistons can be used to recharge a power source that is providing energy and/or current to one or more electromagnetic pistons. For example, current returning back from one or more electromagnetic pistons can be provided to a battery, capacitor, and/or any other device for storing charge.

Figure 9A:
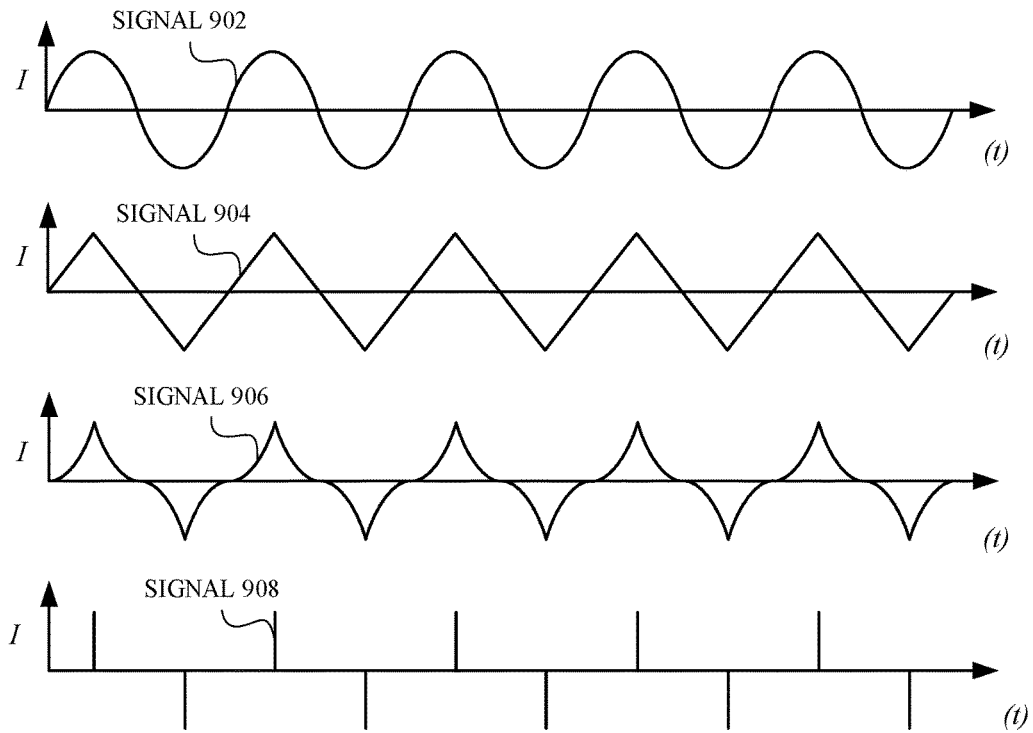
FIGS. 9A-9B show examples of signals that the control system can output and/or transition between when directly or indirectly driving the electromagnetic pistons discussed herein.
Figure 9B:
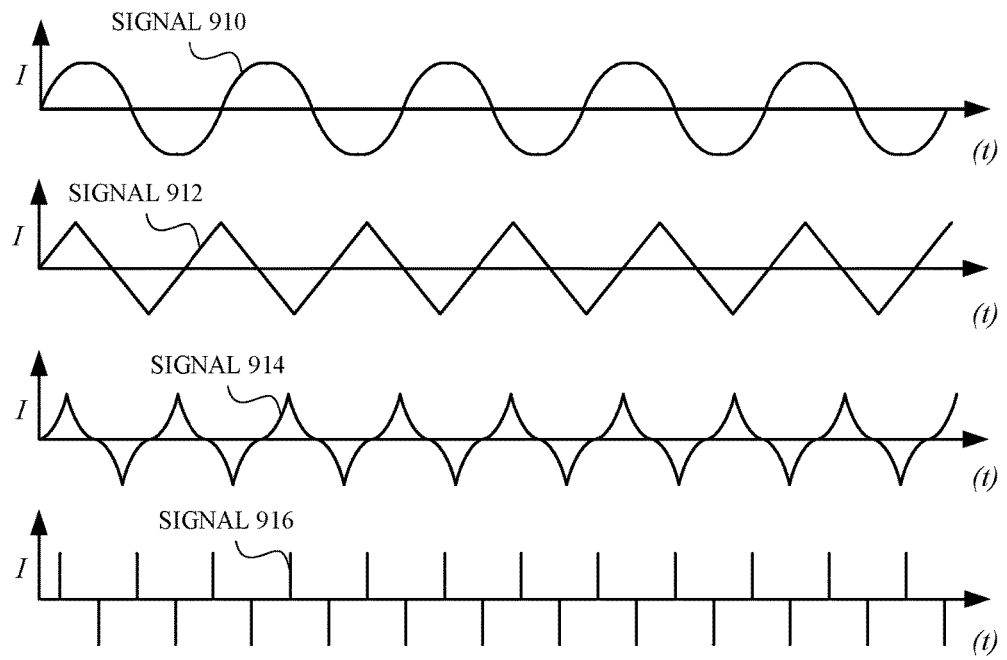

FIGS. 9A-9B show examples of signals that the control system 808 can output and/or transition between when directly or indirectly driving the electromagnetic pistons discussed herein. For example, FIG. 9A illustrates multiple signals that can be transitioned between while keeping that same or substantially the same signal frequency. A signal 902 can be output by the control system 808 to initially drive an electromagnetic piston. After an amount of time has elapsed, and/or some operating characteristic of the electromagnetic piston or vehicle has been achieved (e.g., an efficiency metric or characteristic), the signal 902 can transition to a signal 904. Thereafter, once an amount of time has elapsed, and/or some operating characteristic of the electromagnetic piston or vehicle has been achieved, the signal 904 can transition to signal 906. Thereafter, once an amount of time has elapsed, and/or some operating characteristic of the electromagnetic piston or vehicle has been achieved, the signal 906 can transition to signal 908. In some embodiments, transitions between signals output by the control system 808 can be a function of a desired velocity for a vehicle that is being propelled by one or more electromagnetic pistons. For example, a user or a computer driving the vehicle can determine the desired velocity for the vehicle and directly or indirectly input the desired velocity into the control system 808. In response, the control system 808 can initially output a first signal output, and then transition to a second signal output when the user or the computer driving the vehicle provides an updated desired velocity input. It should be noted that the shape of a signal output by the control system 808 can remain substantially unchanged while the frequency and/or amplitude of the signal output by the control system 808 changes. For example, the control system 808 can output impulses of different frequency and/or amplitude, as well as sine waves and/or cosine waves of different frequency and/or amplitude. Additionally, in some embodiments, the control system 808 can be configured to provide the signal output as a wave that has positive or negative amplitude for multiple periods (e.g., pulses that are consecutively positive).

FIG. 9B illustrates multiple signals that the control system 808 can output and/or transition between in order to change a frequency of oscillation for an electromagnetic piston and reduce or improve charge consumption of the electromagnetic piston, the control system 808, and/or a vehicle being propelled by one or more electromagnetic pistons. It should be noted that FIG. 9B can be understood in view of the discussion of FIG. 9A. For example, a signal 910 can be output by the control system 808 initially, and thereafter, in order to increase an oscillation frequency and improve charge consumption efficiency, the signal 910 can transition to signal 912. Signal 912 is a signal having a higher frequency than signal 910 and a smaller absolute value integral per half period than signal 910. As the control system 808 is directed to increase oscillation frequency of the electromagnetic piston, the control system 808 can transition from outputting signal 912 to signal 914. Signal 914 is a signal having a higher frequency than signal 912 and a smaller absolute value integral per half period than signal 912. Finally, as the control system 808 is directed to further increase oscillation frequency of the electromagnetic piston, the control system 808 can transition from outputting signal 914 to signal 916. Signal 916 is a signal having a higher frequency than signal 914 and a smaller absolute value integral per half period than signal 914. Thereafter, if the control system 808 continues to increase the frequency of oscillation of the electromagnetic piston, the control system 808 can output any of the signals discussed herein at a higher frequency (e.g., the impulses of signal 916). It should be noted that any of the signals discussed herein can be voltage, current, and/or power signals. Therefore, the "I" axes in FIGS. 9A and 9B can represent current, voltage, power, or any other suitable metric for a signal. In some embodiments, each signal provided in FIGS. 9A and 9B can have the same sign (positive or negative) and each quarter-period, or half period, each signal can be off. In this way, an electromagnetic piston will rely on the signal to move in one direction and then rely on another force (not the signal) to move back in the opposite direction. For example, the force that moves the electromagnetic piston in the opposite direction can be another piston or another the motion of a crankshaft.

By propelling a vehicle using one or more electromagnetic pistons, many benefits can be realized over current vehicle motors such as gas motors and electric motors that have a coil wrapped around a rotating shaft. For example, electromagnetic pistons can optionally receive alternating current (AC) and/or direct current (DC) signals in order to drive the vehicle. By providing such signal versatility, current consumption can be reduced without limiting vehicle performance. Additionally, because of the heat exchange created by the motion or oscillation of an electromagnetic piston, risks of overheating the electromagnetic piston during operation are less relative to gas motors and other electric motors. Therefore, less complicated cooling systems can be incorporated into a vehicle having an electromagnetic piston, thereby reducing the cost of manufacturing the vehicle compared to other vehicles.

Figure 10:
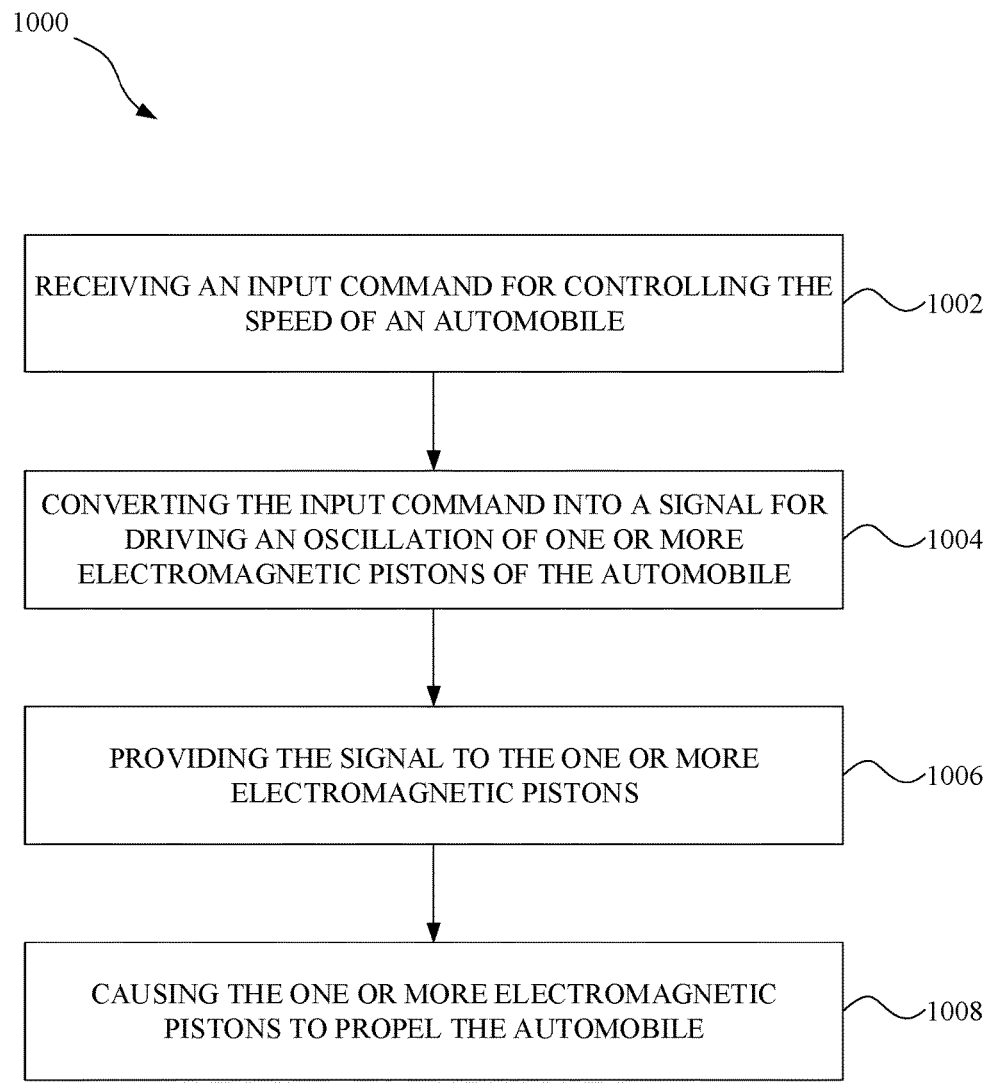
FIG. 10 illustrates a method for controlling the speed of a vehicle driven by an electromagnetic piston.

FIG. 10 describes a method 1000 for controlling the speed of a vehicle driven by an electromagnetic piston. The method 1000 can be performed by the control system 808, a controller, software stored on a non-transitory computer readable storage medium, a computer internal or external to the vehicle, or any other suitable device for driving the vehicle. The method 1000 can include a step 1002 of receiving an input command for controlling the speed of the vehicle. The input command can be from the control system 808, a separate device within the vehicle, a driver of the vehicle, or a device external to the vehicle. The method 1000 can further include a step 1004 of converting the input command into a signal for driving an oscillation of one or more electromagnetic pistons of the vehicle. The one or more electromagnetic pistons can be configured to drive one or more wheels of the vehicle. Additionally, the signal can change dynamically. For example, a shape of the signal can change dynamically in order to reduce charge consumption per half period of the signal, and improve energy efficiency of the vehicle. The method 1000 can further include a step 1006 of providing the signal to the one or more electromagnetic pistons. The signal can be a current signal or a voltage signal. Additionally, the signal can be configured to energize an inductor that causes one or more of the electromagnetic pistons to oscillate. In some embodiments, the signal is selectively provided to one or more of the electromagnetic pistons such that not all of the electromagnetic pistons are receiving the signal concurrently. In other embodiments, each of the electromagnetic pistons receive the signal concurrently or sequentially. The method 1000 can additionally include a step 1008 of causing the one or more electromagnetic pistons to propel the vehicle. It should be noted that the embodiments and methods discussed herein can be combined in any suitable manner. Additionally, it should be noted that the term vehicle can include any suitable means of transportation that can be driven directly or indirectly by an oscillating device or rotating device such as a gas motor or electric motor respectively. Therefore, vehicle can include cars, trucks, trains, airplanes, boats, or any other suitable means of transportation.

Figure 11:
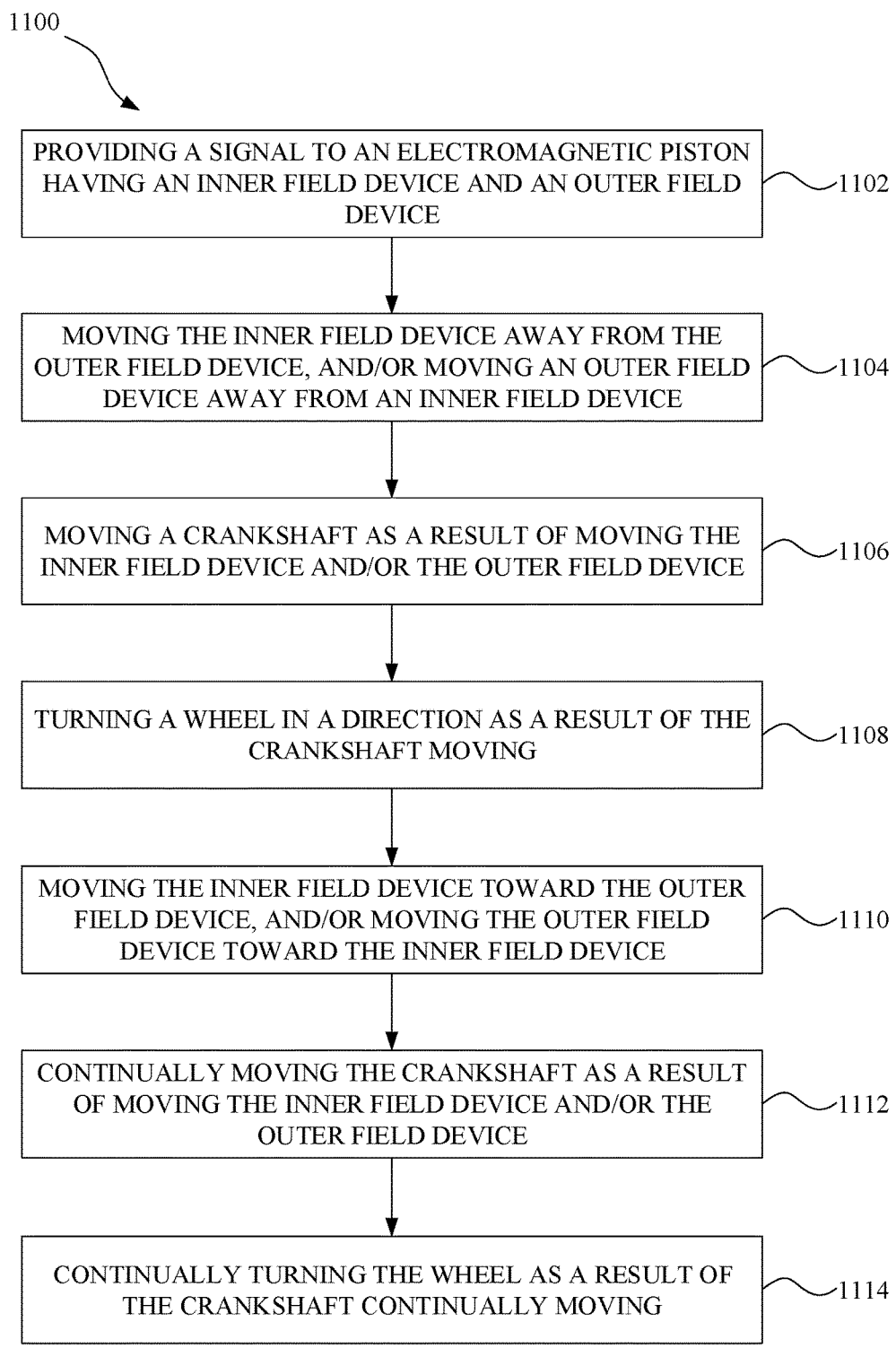
FIG. 11 illustrates a method for operating a crankshaft and wheel using an electromagnetic piston.

FIG. 11 illustrates a method 1100 for operating a crankshaft and wheel using an electromagnetic piston. The method 1100 can be performed by the control system 808, a controller, software stored on a non-transitory computer readable storage medium, a computer internal or external to the vehicle, or any other suitable device for driving the vehicle. The method 1100 can include a step 1102 of providing a signal to an electromagnetic piston having an inner field device and an outer field device, as discussed herein. The signal can a current or voltage signal suitable for moving electrons through an inductor, thereby energizing the inductor. The method 1100 can also include a step 1104 of moving the inner field device away from the outer field device, and/or moving the outer field device away from the inner field device. In this way, the electromagnetic piston incorporating the inner field device and the outer field device will directly or indirectly cause a crankshaft connected to the electromagnetic piston to move. The method 1100 further includes a step 1106 of moving the crankshaft as a result of moving the inner field device and/or the outer field device in step 1104. At step 1108, a wheel is turned in a certain direction as a result of the crankshaft moving. The method 1100 can further include a step 1110 of moving the inner field device toward the outer field device, and/or moving the outer field device toward the inner field device. The method 1100 can also include a step 1112 of continually moving the crankshaft as a result of moving the inner field device and/or the outer field device, and a step 1114 of continually turning the wheel as a result of the crankshaft continually moving.

Figure 12A:
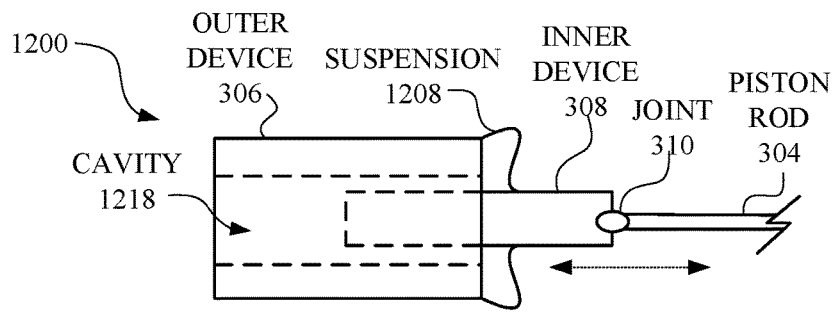
FIGS. 12A-12D illustrate embodiments of an electromagnetic piston having one or more support mechanisms.

FIGS. 12A-12D illustrate embodiments of an electromagnetic piston having one or more support mechanisms. It should be noted that any of the features described herein can be combined with any other features, and any of these combinations is within the scope of this disclosure. FIG. 12A illustrates a diagram 1200 of an electromagnetic piston having a suspension 1208 to support the inner device 308. The suspension 1208 can be one or more pieces of material that hold the inner device 308 suspended within the outer device 306. The suspension 1208 can be a flexible material that can move, flex, and/or stretch as a result of the inner device 308 moving in and out of cavity 1218 of the outer device 308. The cavity 1218 can be an aperture that traverses the entire length of the outer device 308, or a cavity that extends through less than the entire length of the outer device 308. As discussed herein, by providing electrical current to the inner device 308 and/or outer device 306, the inner device 308 and/or outer device 306 can be caused to repeatedly move in and out of the other (e.g., the inner device 308 periodically moving in and out of the outer device 306). As a result, a piston rod 304 connected to a joint 310 of the inner device 308 can be caused to perform some operation not limited to turning a wheel, generate electricity, pump a fluid, move a robotic part, pull an object, or any other suitable operation that can be performed using periodic motion.

The suspension 1208 can connect to one or more portions of the outer device 306 and the inner device 308. The suspension 1208 can connect to opposite sides of a surface of the outer device 306 and/or opposite sides of a surface of the inner device 308. Additionally, the suspension 1208 can be directly or indirectly connected to each of the outer device 306 and inner device 308. In this way, because each of the inner device 308 and the outer device 306 can incorporate magnetic wire, in some embodiments it can be beneficial to not attach anything directly to a surface of the magnetic wire that would cause friction against the magnetic wire. For example, in some embodiments, magnetic wire is within an outer layer of each of the outer device 306 and the inner device 308.

The suspension 1208 can be configured to allow for an exchange of heat between the air and the inner device 308 and/or outer device 306. For example, in FIG. 12A, the suspension 1208 and the inner device 308 can be pulled away from an end of the outer device 306 opposite the suspension 1208 causing air to be pulled into the cavity 1218. If the outer device 306 and/or inner device 308 are heated, the air in the cavity will receive some of the heat. When the inner device 308 and the suspension 1208 are pulled back toward the opposite end of the outer device 306, the air will be expelled from the cavity. Thereafter, cooler air than the air expelled can be pulled back into the cavity by movement of the suspension 1208 and the inner device 308 in order to cause another exchange of heat that reduces the temperature of the inner device 308 and outer device 306. This provides an advantage over rotating electric motors that are not able to exchange heat as a result of operating the rotating electric motors.

Figure 12B:
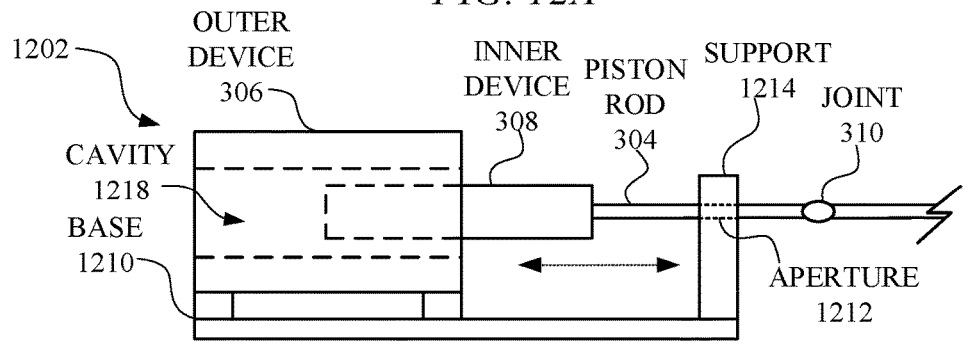

FIG. 12B illustrates a diagram 1202 of a support 1214 that can be used to hold the inner device 308 in place. The support 1214 can be a piece of material having one or more apertures 1212 in order allow the piston rod 304 to move through the one or more apertures of the support 1214. In this way, the movement of the inner device 308 within the outer device 306 will be limited by the shape of the crankshaft to which the piston rod 304 can be directly or indirectly connected. For example, a point where the piston rod 304 connects to the crankshaft (e.g., crankshaft 402) can be a radial distance from an axis of rotation of the crankshaft. As a result, and in some embodiments, the movement of the inner device 308 will be limited based on the radial distance. The support 1214 can be connected to a base 1210 that also directly supports the electromagnetic piston. However, in some embodiments, the support 1214 can be connected to a base 1210 that does not directly support the electromagnetic piston. The support 1214 can be directly or directly connected to a surface of an automobile or other surface of another device. The aperture 1212 of the support 1214 can be lubricated to allow for a less friction to occur as a result of the piston rod 304 moving through the support 1214.

In some embodiments, the aperture 1212 can be configured to provide a contactless support for the piston rod 304. For example, the piston rod 304 can be an electromagnet and the aperture 1212 can also be an electromagnetic. By charging each electromagnet of the piston rod 304 and the aperture 1212 to be equal polarities, or otherwise create respective electromagnetic fields that repel each other, the piston rod 304 can glide through the aperture 1212 with little or no friction created. In some embodiments, a signal used to charge the inner device 308 and/or the piston rod 304 can also be used to create a signal for creating an electromagnet at the aperture 1212. In this way, each signal sent to the inner device 308, piston rod 304, and/or aperture 1212 can electromagnetic fields that repel each other. In some embodiments, the signals sent to the inner device 308, piston rod 304, and/or aperture 1212 are alternating current signals that create electromagnets that periodically change polarity. Therefore, even when the polarity of the electromagnet of the aperture 1212 is changing, it will still have the same polarity as the piston rod 304 and/or the inner device 308, and hence repel the piston rod 304 and/or the inner device 308.

Figure 12C:
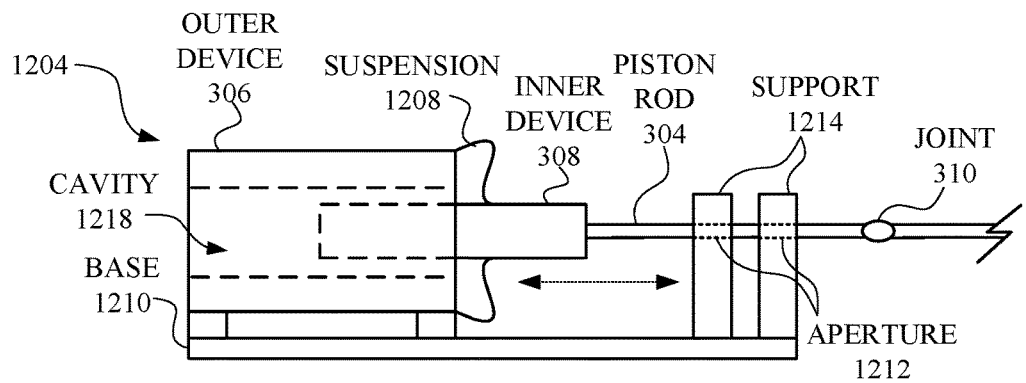

FIG. 12C illustrates and embodiment of the electromagnetic piston having a suspension 1208 and one or more supports 1214. The suspension 1208 can be any suitable type of suspension for suspending an object within a cavity. For example, the suspension 1208 can be made of a flexible material that can at least bend and/or stretch in order to the inner device 308 to move toward and away from the outer device 306 repeatedly. When the inner device 308 moves away from the outer device 306 as a result of an electrical current passing through the inner device 308 and/or the outer device 306, a piston rod 304 will be forced to move. The movement of the piston rod 304 causes the piston rod 304 to move through one or more apertures 1212 in a support 1214. The support 1214 can be connected to a base 1210, which can represent the surface of a machine such as an automobile, manufacturing device, medical device, airplane, train, appliance, or any other suitable device that can be configured with a motor.

Figure 12D:
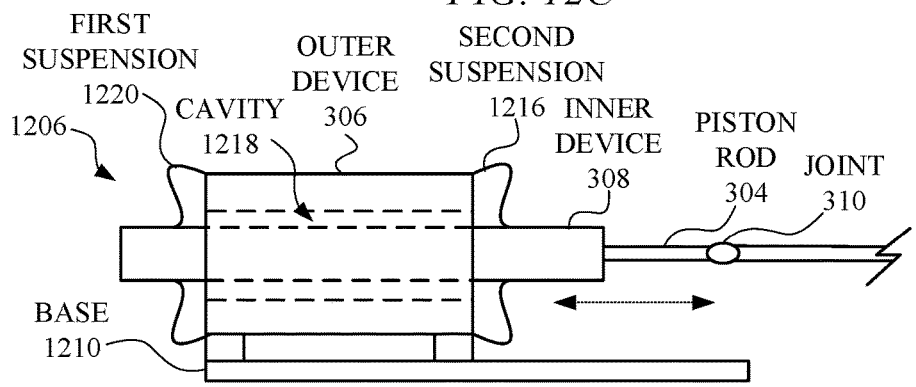

FIG. 12D illustrates an embodiment of the electromagnetic piston having two or more suspensions 1208. For example, the electromagnetic piston can have a first suspension 1220 connected to an end of the outer device 306 and a second suspension 1216 connected to a different end of the outer device 306. The suspensions discussed herein can be coupled to the inner device 308 and/or the outer device 306 using any suitable means for coupling two objects. For example, the suspension 1208 can be coupled to the outer device 306 at one or more locations on the outer device 306 directly or indirectly in order to ensure a strong coupling between the suspension 1208 and the outer device 306. Furthermore, the first suspension 1220 and the second suspension 1216 can include openings that allow air to pass through the cavity 1218. Air flow is important for exchanging heat generated within the cavity with cooler air outside the cavity, in order to improve operability of the electromagnetic piston. In some embodiments, the suspension(s) of the electromagnetic piston can be configured with one or more one way valves (e.g., check valves) in order to direct the flow of air through the cavity 1218. For example, the first suspension 1220 can include a check valve that allows air to flow in the direction of the piston rod 304 and the second suspension 1216 can also include a check valve that allows air to flow in the direction of the piston rod 304. In this way, when the inner device 308 at least partially oscillates in and out of the outer device 306, at least some amount of air will pass through the cavity 1218 from the check valve in the first suspension 1220 through the check valve in the second suspension 1216. The check valve can be any suitable type of check valve for air or fluid. For example, in some embodiments the check valve is a flexible piece of material overlaying an aperture of a layer of the suspension and connected to the layer of the suspension adjacent to the aperture. In this way, the flexible piece of material will flex and allow air to pass through the aperture when a force is applied to the flexible piece of material through the aperture from a side of the suspension opposite the flexible piece of material.

Figure 13A:
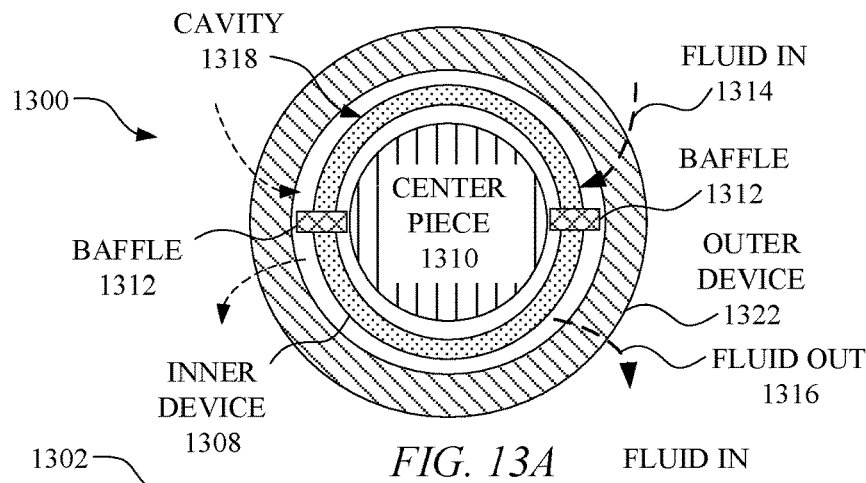
FIGS. 13A-13C illustrate embodiments of an electromagnetic piston having a suspension, a baffle, and one or more check valves for exchanging heat that can be created as a result of operating the electromagnetic piston.
Figure 13B:
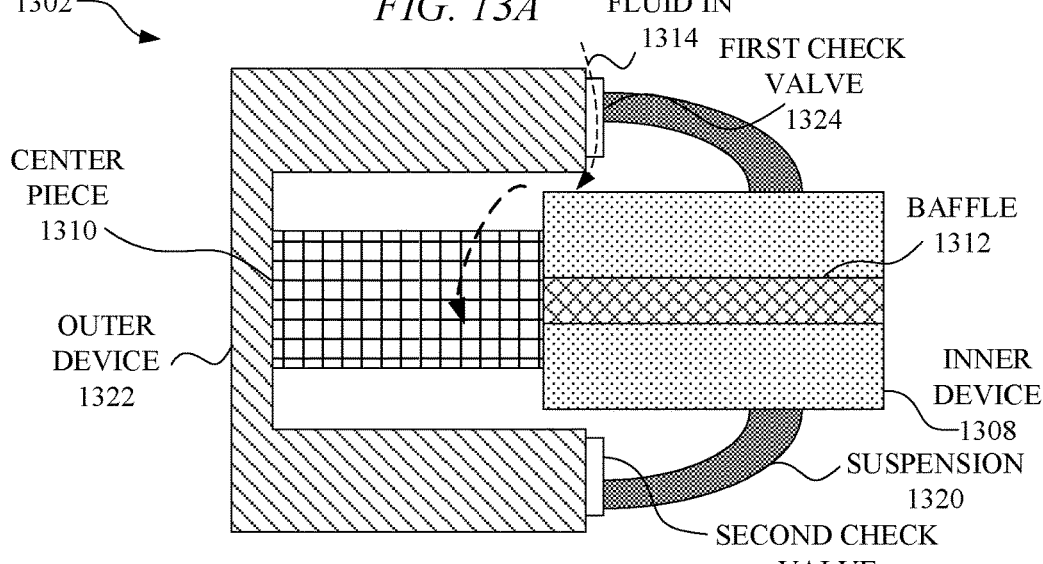
Figure 13C:
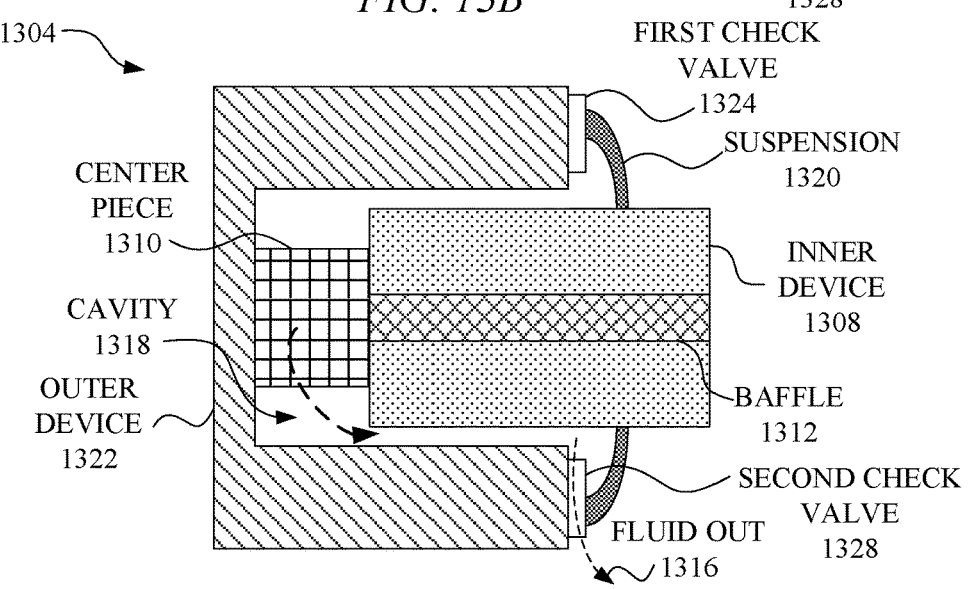

FIGS. 13A-13C illustrate embodiments of an electromagnetic piston having a suspension 1320, a baffle 1312, and one or more check valves for exchanging heat that can be created as a result of operating the electromagnetic piston. In this embodiment, during each oscillation of the electromagnetic piston, a fluid such as air or water can enter and exit a cavity 1318 of the electromagnetic piston. FIG. 13A illustrates a cross-sectional view 1300 of an embodiment of the electromagnetic piston having a baffle 1312 attached to the inner device 1308. The inner device 1308 can surround a center piece 1310, which can be an inductor or non-inductor. In embodiments where the center piece 1310 is an inductor, the center piece 1310 can be configured to receive a signal from the control system 808 discussed herein. The center piece 1310 can also be configured to receive the same or a different signal than the inner device 1308 or outer device 1322 during operation of the electromagnetic piston.

Heat is exchanged during operation of the electromagnetic piston can be accomplished by allowing a fluid to enter cavity 1318, as indicated by the fluid in 1314 arrow of FIG. 13A. Fluid can enter when a pressure within the cavity 1318 is reduced by operation of the electromagnetic piston. When pressure within the cavity 1318 is increased, the fluid will exit the cavity 1318, as illustrated by the fluid out 1316 arrow. There will be a difference in temperature between the fluid in 1314 and the fluid out 1316 when the temperature within the cavity 1318 is different than the fluid in 1314 temperature.

FIG. 13B illustrates a cross-sectional view 1302 of an embodiment of the electromagnetic piston during operation. Specifically, FIG. 13B illustrates the inner device 1308 opposing the outer device 1322 as a result of an electromagnetic force created in the inner device 1308 and/or the outer device 1322. As a result of the electromagnetic force, the inner device 1308 moves away from the outer device 1322 causing a fluid to enter the cavity 1318 by way of the a first check valve 1324, as indicated by the fluid in arrow 1314. It should be noted that the outer device 1322 and/or inner device 1308 can be magnets and/or inductors in order to realize the oscillations of the electromagnetic piston as further discussed herein. In this way, when a polarity of electromagnetic fields created by the outer device 1322 and the inner device 1308 (and the center piece 1310 in some embodiments) are in the same direction, the outer device 1322 and inner device 1308 will oppose each other. Similarly, as illustrated in FIG. 13C, when a polarity of the electromagnetic fields created by the outer device 1322 and the inner device 1308 (and the center piece 1310 in some embodiments) are in opposing directions, the outer device 1322 and inner device 1308 will attract each other. As a result, a fluid will exit the cavity 1318 through the second check valve 1328 as illustrated by the fluid out 1316 arrow. A baffle 1312 can be attached to the inner device 1308 in some embodiments in order to guide a fluid in and out of the cavity 1318. The baffle 1312 can be configured to maximize an amount of surface area of the inner device 1308 and/or the outer device 1322 that the fluid will come into contact with. For example, in FIGS. 13A-13C, the baffle 1312 extends over at least part of a length of the inner device 1308 on at least two sides of the inner device 1308. However, it should be noted that the baffle 1312 can be configured in any suitable arrangement in order to maximize the amount of heat exchange with a fluid that is passing through the cavity 1318. For example, the baffle 1312 can be connected to the center piece 1310, inner device 1308, outer device 1322, and/or the suspension 1320.

Each of the first check valve 1324 and the second check valve 1328 can be connected directly or indirectly to the outer device 1322, inner device 1308, and/or the suspension 1320. Additionally, each of the first check valve 1324 and the second check valve 1328 can be any suitable types of check valves that allow a fluid (i.e., a gas or liquid) to enter the cavity 1318 and exit the cavity 1318 as a result of a pressure change within the cavity 1318.

Figure 14A:
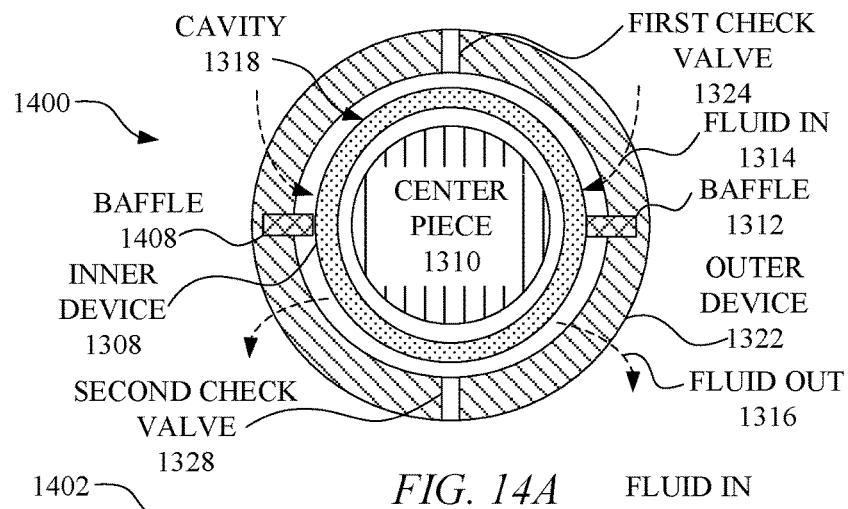
FIGS. 14A-14C illustrate embodiments of an electromagnetic piston having a suspension, a baffle, and one or more check valves for exchanging heat that can be created as a result of operating the electromagnetic piston.
Figure 14B:
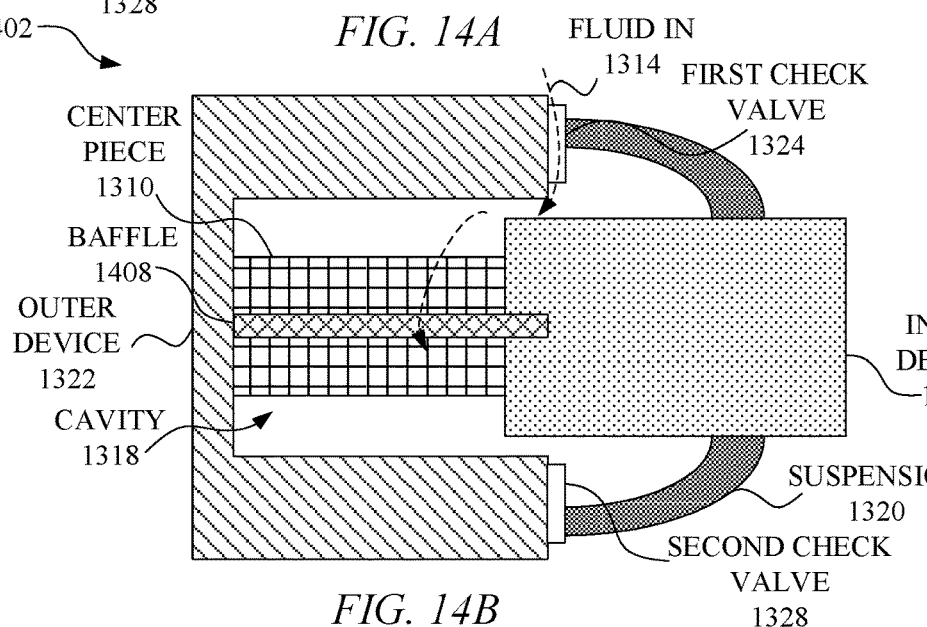
Figure 14C:
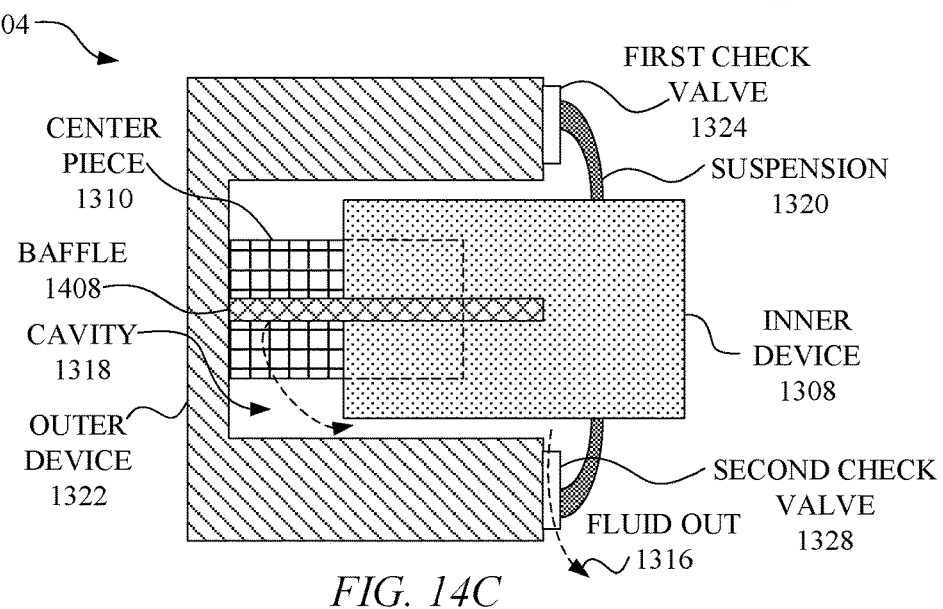

FIGS. 14A-14C illustrate embodiments of an electromagnetic piston having a suspension 1320, a baffle 1408, and one or more check valves for exchanging heat that can be created as a result of operating the electromagnetic piston. In this embodiment, during each oscillation of the electromagnetic piston, a fluid such as air or water can enter and exit a cavity 1318 of the electromagnetic piston. FIG. 14A illustrates a cross-sectional view 1400 of an embodiment of the electromagnetic piston having a baffle 1408 attached to the outer device 1322. The inner device 1308 can surround a center piece 1310, which can be an inductor or non-inductor. In embodiments where the center piece 1310 is an inductor, the center piece 1310 can be configured to receive a signal from the control system 808 discussed herein. The center piece 1310 can also be configured to receive the same or a different signal than the inner device 1308 or outer device 1322 during operation of the electromagnetic piston.

Heat is exchanged during operation of the electromagnetic piston can be accomplished by allowing a fluid to enter cavity 1318, as indicated by the fluid in 1314 arrow of FIG. 13A. Fluid can enter when a pressure within the cavity 1318 is reduced by operation of the electromagnetic piston. When pressure within the cavity 1318 is increased, the fluid will exit the cavity 1318, as illustrated by the fluid out 1316 arrow. There will be a difference in temperature between the fluid in 1314 and the fluid out 1316 when the temperature within the cavity 1318 is different than the fluid in 1314 temperature.

FIG. 13B illustrates a cross-sectional view 1302 of an embodiment of the electromagnetic piston during operation. Specifically, FIG. 13B illustrates the inner device 1308 opposing the outer device 1322 as a result of an electromagnetic force created in the inner device 1308 and/or the outer device 1322. As a result of the electromagnetic force, the inner device 1308 moves away from the outer device 1322 causing a fluid to enter the cavity 1318 by way of the a first check valve 1324, as indicated by the fluid in arrow 1314. It should be noted that the outer device 1322 and/or inner device 1308 can be magnets and/or inductors in order to realize the oscillations of the electromagnetic piston as further discussed herein. In this way, when a polarity of electromagnetic fields created by the outer device 1322 and the inner device 1308 (and the center piece 1310 in some embodiments) are in the same direction, the outer device 1322 and inner device 1308 will oppose each other. Similarly, as illustrated in FIG. 13C, when a polarity of the electromagnetic fields created by the outer device 1322 and the inner device 1308 (and the center piece 1310 in some embodiments) are in opposing directions, the outer device 1322 and inner device 1308 will attract each other. As a result, a fluid will exit the cavity 1318 through the second check valve 1328 as illustrated by the fluid out 1316 arrow. A baffle 1408 can be attached to the outer device 1322 in some embodiments in order to guide a fluid in and out of the cavity 1318. The baffle 1408 can be configured to maximize an amount of surface area of the inner device 1308 and/or the outer device 1322 that the fluid will come into contact with. For example, in FIGS. 14A-14C, the baffle 1408 extends over at least part of a length of the outer device 1322 on at least two sides of the outer device 1322. However, it should be noted that the baffle 1408 can be configured in any suitable arrangement in order to maximize the amount of heat exchange with a fluid that is passing through the cavity 1318. For example, the baffle 1408 can be connected to the center piece 1310, inner device 1308, outer device 1322, and/or the suspension 1320.

Each of the first check valve 1324 and the second check valve 1328 can be connected directly or indirectly to the outer device 1322, inner device 1308, and/or the suspension 1320. Additionally, each of the first check valve 1324 and the second check valve 1328 can be any suitable types of check valves that allow a fluid (i.e., a gas or liquid) to enter the cavity 1318 and exit the cavity 1318 as a result of a pressure change within the cavity 1318. It should be noted that any embodiments of the electromagnetic piston discussed herein can be replaced or used in any of the Figures provided herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The code can be used for operating the embodiments set forth, controlling manufacturing operations, or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A vehicle configured to be propelled by at least one electromagnetic piston, the vehicle comprising:
   an electromagnetic piston configured to oscillate when energized by a drive signal, the electromagnetic piston comprising:
      a baffle that extends into a cavity of the electromagnetic piston and guides a flow of air or fluid through the cavity during operation of the electromagnetic piston, and
      at least one check valve that directs air or fluid into or out of the cavity of the electromagnetic piston;
   a control system that is configured to:
      provide the drive signal to the electromagnetic piston, and
      adjust a velocity of the electromagnetic piston by changing a frequency, amplitude, or phase of the drive signal; and
   a crankshaft connected to at least one wheel that supports a weight of the vehicle and rotates according to a motion of the electromagnetic piston.

2. The vehicle of claim 1, wherein:
   the electromagnetic piston includes an outer device and an inner device that are each configured to provide a magnetic field;
   at least one of the outer device and the inner device are configured to receive the drive signal; and
   the outer device is wider than the inner device.

3. The vehicle of claim 1, wherein:
   the electromagnetic piston is connected to a surface of the vehicle;
   the vehicle includes a support member that comprises an aperture; and
   the electromagnetic piston includes a piston rod that (a) traverses at least a portion of the aperture and (b) is configured to transfer a force of the electromagnetic piston to the crankshaft.

4. The vehicle of claim 1, wherein:
   the electromagnetic piston includes a suspension configured to suspend an inner device of the electromagnetic piston at least partially within an outer device of the electromagnetic piston, wherein during an oscillation of the electromagnetic piston an exchange of heat occurs inside of the cavity using a gas or fluid that is outside of the outer device.

5. The vehicle of claim 1, wherein:
   the electromagnetic piston includes a joint connected between the crankshaft and piston rod, and
   the piston rod is configured to pivot about the joint simultaneous to the electromagnetic piston rotating the crankshaft.

6. The vehicle of claim 1, wherein the at least one check valve includes a first check valve configured to direct air into the cavity and a second check valve configured to direct air out of the cavity.

7. The vehicle of claim 1, further comprising:
   multiple electromagnetic pistons, wherein at least one electromagnetic piston of the multiple electromagnetic pistons is configured to receive a phase shifted drive signal that is out of phase from the drive signal.

8. The vehicle of claim 1, further comprising:
   a counterweight connected to the crankshaft, wherein the counterweight is configured to counter a force of the electromagnetic piston in order to mitigate uneven torque when the at least one wheel of the vehicle is rotating as a result of the force of the electromagnetic piston.

9. The vehicle of claim 1, wherein:
   (i) a power source of the vehicle includes a battery, a solar panel, or a hydrogen fuel cell; and
   (ii) the control system is configured to receive a feedback signal from the electromagnetic piston and increase or decrease an amount of energy of the drive signal based on the feedback signal.

10. An electric piston comprising:
    a first inductor that at least partially defines a cavity;
    a baffle connected to the first inductor for directing air or fluid through the cavity;
    a second inductor at least partially surrounded by the first inductor and suspended within the cavity of the first inductor by way of a suspension connected to the second inductor, wherein the first inductor and the second inductor are configured to receive an oscillating drive signal and, in response to the oscillating drive signal, provide an electromagnetic force that causes:
(i) the second inductor to move toward and/or away from the first inductor, and
(ii) a heat exchange to occur within the cavity of the first inductor when an gas or fluid external to the first inductor moves into the cavity and around the baffle as a result of the second inductor moving toward and/or away from the first inductor.

11. The electric piston of claim 10, wherein the electric piston is configured to oscillate using, non-concurrently, both (i) a direct current (DC) signal and (ii) an alternating current (AC) signal.

12. The electric piston of claim 10, further comprising a control system, wherein the electric piston is configured to output a feedback signal to the control system, and, in response, receive, from the control system, a different drive signal that has a different shape than the oscillating drive signal.

13. The electric piston of claim 10, further comprising:
(i) a first check valve configured to channel the gas or fluid into the cavity, and
(ii) a second check valve configured to channel the gas or fluid out of the cavity, wherein the gas or fluid enters the cavity through the first check valve in response to the second inductor moving away from the first inductor, and the gas or fluid exits the cavity through the second check valve in response to the second inductor moving away from the first inductor.

14. The electric piston of claim 10, further comprising:
a piston rod; and
a support member comprising an aperture, wherein the aperture is configured to guide the piston rod when the second inductor is moving toward and/or away from the first inductor and suspend the second inductor within the first inductor.

15. A system comprising:
an electric piston that includes:
an inner coil device, and
an outer coil device that at least partially defines a cavity and is configured to repel the inner coil device when the electric piston receives an electrical signal;
a baffle configured to direct air or fluid that travels through the cavity when the electric piston receives the electrical signal and the inner coil device oscillates in and out of the outer coil device;
at least one check valve that is configured to direct air or fluid toward the baffle, and in or out of the cavity.

16. The system of claim 15, where the at least one check valve includes a first check valve for directing the air or fluid into the cavity and a second check valve for directing air or fluid out of the cavity.

17. The system of claim 15, further comprising a crankshaft that includes a pin, wherein the electric piston is configured to push or pull the pin in order to rotate the crankshaft.

18. The system of claim 15, further comprising a control system for driving the electric piston, wherein the control system is configured to concurrently change a frequency and an amplitude of the electrical signal.

19. The system of claim 18, wherein the control system is configured to change a shape of the oscillating current signal to be a circular wave function during operation of the electric piston.

20. The system of claim 15, further comprising a suspension configured to suspend the inner coil device at least partially within the outer coil device, wherein the at least one check valve allows air or fluid to enter a volume of the cavity, which is at least partially defined by the suspension.

* * * * *